United States Patent
Song et al.

(10) Patent No.: US 9,967,587 B2
(45) Date of Patent: *May 8, 2018

(54) APPARATUS AND METHOD FOR ENCODING/DECODING IMAGES

(71) Applicant: SK TELECOM CO., LTD., Seoul (KR)

(72) Inventors: Jinhan Song, Seoul (KR); Jeongyeon Lim, Seongnam-si (KR); Joohee Moon, Seoul (KR); Yunglyul Lee, Seoul (KR); Haekwang Kim, Seoul (KR); Byeungwoo Jeon, Seongnam-si (KR); Jongki Han, Seoul (KR); Hyoungmee Park, Suwon-si (KR); Juock Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 357 days.

This patent is subject to a terminal disclaimer.

(21) Appl. No.: 14/752,108

(22) Filed: Jun. 26, 2015

(65) Prior Publication Data

US 2015/0296216 A1 Oct. 15, 2015

Related U.S. Application Data

(63) Continuation of application No. 13/641,673, filed as application No. PCT/KR2011/002761 on Apr. 18, 2011.

(30) Foreign Application Priority Data

Apr. 16, 2010 (KR) ........................ 10-2010-0035533
Apr. 16, 2011 (KR) ........................ 10-2011-0035424

(51) Int. Cl.
*H04N 19/96* (2014.01)
*H04N 19/513* (2014.01)
(Continued)

(52) U.S. Cl.
CPC ......... *H04N 19/513* (2014.11); *H04N 19/109* (2014.11); *H04N 19/119* (2014.11);
(Continued)

(58) Field of Classification Search
None
See application file for complete search history.

(56) References Cited

U.S. PATENT DOCUMENTS

2009/0110066 A1* 4/2009 Wang ................... H04N 19/176
375/240.12
2010/0086030 A1* 4/2010 Chen .................... H04N 19/176
375/240.12

(Continued)

FOREIGN PATENT DOCUMENTS

KR 1020090129926 A 12/2009
KR 1020090129939 A 12/2009

(Continued)

OTHER PUBLICATIONS

ITU, ITU-T Recommendation H.264, Advanced Video Coding for Generic Audiovisual Services, Mar. 2005.*

(Continued)

*Primary Examiner* — Michael J Hess
(74) *Attorney, Agent, or Firm* — Hauptman Ham, LLP

(57) ABSTRACT

A method performed by a video decoding apparatus, includes: identifying a current block to be decoded by dividing a maximum size block; decoding, from a bitstream, block mode information indicating whether a block mode of the current block to be decoded is a skip mode; when the block mode information indicates that the block mode of the current block is the skip mode, decoding, from the bitstream, a skip motion information of the current block and determining a motion vector of the current block based on the skip motion information, predicting the current block using (Continued)

the determined motion vector current block, and reconstructing the current block directly from the predicted block, without decoding information on residual signals of the current block from the bitstream.

6 Claims, 32 Drawing Sheets

(51) Int. Cl.
*H04N 19/119* (2014.01)
*H04N 19/109* (2014.01)
*H04N 19/463* (2014.01)
*H04N 19/176* (2014.01)
*H04N 19/139* (2014.01)
*H04N 19/186* (2014.01)
*H04N 19/52* (2014.01)

(52) U.S. Cl.
CPC ......... *H04N 19/139* (2014.11); *H04N 19/176* (2014.11); *H04N 19/186* (2014.11); *H04N 19/463* (2014.11); *H04N 19/52* (2014.11); *H04N 19/96* (2014.11)

(56) References Cited

U.S. PATENT DOCUMENTS

| | | | |
|---|---|---|---|
| 2010/0086032 A1* | 4/2010 | Chen | H04N 19/176 375/240.12 |
| 2010/0086051 A1* | 4/2010 | Park | H04N 19/176 375/240.16 |
| 2010/0135391 A1* | 6/2010 | Tian | H04N 19/597 375/240.12 |
| 2010/0177824 A1* | 7/2010 | Koo | H04N 19/597 375/240.16 |
| 2010/0208827 A1* | 8/2010 | Divorra Escoda | H04N 19/176 375/240.24 |
| 2010/0220790 A1* | 9/2010 | Jeon | H04N 19/55 375/240.16 |
| 2010/0239015 A1* | 9/2010 | Wang | H04N 19/197 375/240.16 |
| 2010/0266042 A1* | 10/2010 | Koo | H04N 19/597 375/240.16 |
| 2011/0090967 A1* | 4/2011 | Chen | H04N 19/70 375/240.16 |
| 2011/0261888 A1* | 10/2011 | Cammas | H04N 19/176 375/240.24 |
| 2012/0008676 A1* | 1/2012 | Lee | H04N 19/137 375/240.02 |
| 2013/0034152 A1* | 2/2013 | Song | H04N 19/119 375/240.03 |

FOREIGN PATENT DOCUMENTS

| | | |
|---|---|---|
| KR | 1020100018191 A | 2/2010 |
| KR | 1020100020984 A | 2/2010 |

OTHER PUBLICATIONS

Vermeirsch et al., "Extended Macroblock Bipartitioning Modes for H.264/AVC Inter Coding," Tenth IEEE International Symposium on Multimedia, 2008.*

Karczewicz et al., "Video Coding Using Extended Block Sizes," Jan. 2009.*

Korean Office Action dated Mar. 31, 2017 corresponding to Korean Application No. KR 10-2011-0035424, citing the above reference(s).

International Search Report dated Dec. 28, 2011 for PCT/KR2011/002761, citing the above reference(s).

ITU. ITU-T Recommendation H.264. Advanced Video Coding for Generic Audiovisual Services, Mar. 2005.

Karczewicz et al., "Video Coding Using Extending Block Sizes," Jan. 2009.

* cited by examiner

6A

Block Mode = Skip Mode

| Block Mode Information | Partition Mode Information | Skip Motion Information |

6B

Block Mode ≠ Skip Mode

| Block Mode Information | Partition Mode Information | Block Type Information | Prediction Information | CBP Subblock Flag | Transform Type Information | CBP | Delta QP | Coefficient Information |

*FIG. 6*

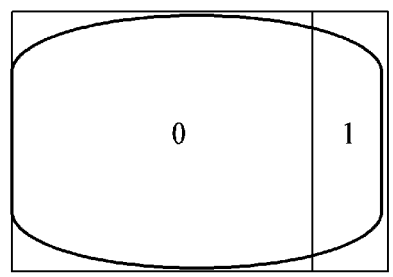
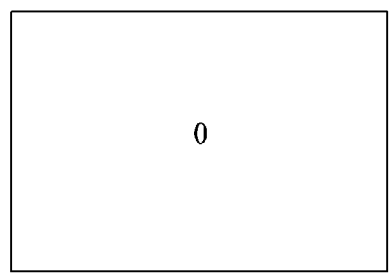
FIG. 9

| EMB Number: 0 | EMB Number: 1 | EMB Number: 2 |
| --- | --- | --- |
| EMB Number: 3 | EMB Number: 4 | EMB Number: 5 |
| EMB Number: 6 | EMB Number: 7 | EMB Number: 8 |

*FIG. 11*

| Skip | CBP16_flag=0 | 8x8 Transform | CBP16_flag=0 | |
|---|---|---|---|---|
| | | 8x8 Transform | | |
| | 8x8 Transform / 8x8 Transform / 8x8 Transform / 8x8 Transform | 8x8 Transform | 8x8 Transform | 4x4 Transform | 4x4 Transform |
| Non-skip CBP32_flag=1 CBP16_flag='1101' 16x16 Transform | 16x8 Transform | 16x16 Transform CBP16_flag=1 | 4x4 Transform | 4x4 Transform |
| | 16x8 Transform | | 4x4 Transform | 4x4 Transform |
| | | 8x16 Transform | 8x16 Transform | |
| Non-skip CBP32_flag=1 CBP16_flag='1001' 4x4 Transform | Skip | 8x8 Transform CBP16_flag=1 | 4x4 Transform |
| | | | 4x4 Transform |
| | | 4x4 Transform CBP16_flag=1 | |

| | | 8x8 Transform | CBP16_flag=0 | |
|---|---|---|---|---|
| Skip | CBP16_flag=0 | 8x8 Transform | | |
| | 8x8 Transform | 8x8 Transform | 8x8 Transform | 8x8 Transform | 4x4 Transform | 4x4 Transform |
| | 8x8 Transform | 8x8 Transform | | | | |
| Non-skip CBP32_flag=1 CBP16_flag='1101' 16x16 Transform | 16x8 Transform | 16x16 Transform CBP16_flag=1 | 4x4 Transform | 4x4 Transform |
| | 16x8 Transform | | 4x4 Transform | 4x4 Transform |
| | | 8x16 Transform | 8x16 Transform | | |
| Non-skip CBP32_flag=1 CBP16_flag='1001' 4x4 Transform | Skip | 8x8 Transform CBP16_flag=1 | 4x4 Transform |
| | | | 4x4 Transform |
| | | 8x8 Transform | 8x8 Transform | 4x4 Transform | 4x4 Transform |
| | | 8x8 Transform | 8x8 Transform | 4x4 Transform | 4x4 Transform |

| 0 | 0 |
|---|---|
| 0 | 0 |

(a)

| 0 | -1 |
|---|---|
| 1 | 2 |

(b)

| 1 | 1 |
|---|---|
| 2 | -1 |

(c)

| -1 | -1 |
|---|---|
| -1 | -1 |

(d)

| -1 | -1 |
|---|---|
| -1 | -3 |

(e)

| 3 | 2 |
|---|---|
| 2 | 1 |

| 0 | 0 |
|---|---|
| 0 | 0 |

(a)

| 0 | 2 |
|---|---|
| 1 | 3 |

(b)

| 1 | 1 |
|---|---|
| 3 | 2 |

(c)

| 2 | 2 |
|---|---|
| 2 | 2 |

(d)

| 2 | 2 |
|---|---|
| 2 | 5 |

(e)

| 5 | 3 |
|---|---|
| 3 | 1 |

Sub_block_CBP / split / Cb_CBP / Cr_CBP / Y_CBP
= 1 / 0 / 1 / 1 / 1

FIG. 41 split / Cb_CBP / Cr_CBP / Y_CBP
= 0 / 1 / 1 / 1

FIG. 42

APPARATUS AND METHOD FOR ENCODING/DECODING IMAGES

CROSS-REFERENCE TO RELATED APPLICATIONS

The present application is a continuation of U.S. patent application Ser. No. 13/641,673 filed Oct. 16, 2012, which is a the National Phase application of International Application No. PCT/KR2011/002761, filed Apr. 18, 2011, which is based upon and claims the benefit of priorities from Korean Patent Application No. 10-2010-0035533, filed on Apr. 16, 2010, Korean Patent Application No. 10-2011-0035424, filed on Apr. 16, 2011. The disclosures of the above-listed applications are hereby incorporated by reference herein in their entirety.

TECHNICAL FIELD

The present disclosure relates to a video encoding and/or decoding apparatus and a method thereof that improve video compression efficiency and video reconstruction efficiency by efficiently encoding encoding information used to encode a video.

BACKGROUND

The statements in this section merely provide background information related to the present disclosure and do not constitute prior art.

Examples of video data compression technologies include H.261, H.263, MPEG-2, and MPEG-4. According to the video compression technologies, encoding each image is carried out after dividing the same into fixedly sized macroblocks which are composed of rectangular 16×16 pixel areas of a luminance or luma component and rectangular 8×8 pixel areas of a chrominance or chroma component. All of the luma and chroma components of the respective macroblocks are spatially or temporally predicted, and the resultant predicted residuals are transformed, quantized, and entropy-coded prior to transmission.

A block mode used in an existing video encoding apparatus encodes a flag indicating that a current encoding target block uses a predicted motion vector and has no transform coefficient to be encoded, and does not encode any more information. In the case of a block that does not use a predicted motion vector or has a transform coefficient to be encoded, type information of the block and prediction information of the block (a difference vector from the predicted motion vector and a reference picture number) are encoded and a transform coefficient is encoded.

However, the inventor(s) has experienced that in such typical video compression technologies, it is difficult to efficiently encode a block that has only a difference motion vector as data to be encoded and has no transform coefficient to be encoded, or a block that has no difference motion vector and has only a transform coefficient to be encoded, and it is difficult to efficiently encode various information used to encode a video.

In addition, the inventor(s) has experienced that the operation in unison between encoding and decoding the video makes it difficult to expect a highly efficient video decoding from the already deteriorated compression efficiency of the video encoding.

SUMMARY

In accordance with some embodiments of the present disclosure, a method performed by a video decoding apparatus, comprises: identifying a current block to be decoded by dividing a maximum size block; decoding, from a bitstream, block mode information indicating whether a block mode of the current block to be decoded is a skip mode; when the block mode information indicates that the block mode of the current block is the skip mode, decoding, from the bitstream, a skip motion information of the current block and determining a motion vector of the current block based on the skip motion information, predicting the current block using the determined motion vector current block, and reconstructing the current block directly from the predicted block, without decoding information on residual signals of the current block from the bitstream; and when the block mode information indicates that the block mode of the current block is not the skip mode, decoding prediction information of the current block from the bitstream, reconstructing information on residual signals of one or more subblocks divided from the current block, by decoding partition information of a tree structure from the bitstream, and reconstructing the current block based on the information on the residual signals of each of the subblocks and the prediction information.

DESCRIPTION OF DRAWINGS

FIG. 6 is an illustration diagram of a syntax structure of a bitstream encoded according to at least one embodiment of the present disclosure;

FIGS. 9 and 10 are diagrams of an example of a tree structure according to at least one embodiment of the present disclosure;

FIGS. 11 and 12 are diagrams of transform type encoding and decoding according to at least one embodiment of the present disclosure;

FIG. 13 is a diagram of an example of a lowermost node value for a transform type value to be encoded;

FIG. 14 is a diagram of an example of an uppermost node value in FIG. 13;

FIG. 22 is a diagram of an example of a selected transform type and a selected block mode in an encoder;

FIG. 23 is a diagram of an example of a lowermost node value for a CBP bit value and a transmission unit of a CBP bit;

FIG. 24 is a diagram of an example of an uppermost node value in the event where a block corresponding to a 16×16 region in FIG. 23 is used as an uppermost block;

FIG. 25 is a diagram of an example of delta quantization parameter encoding;

FIG. 26 is a diagram of an example of the event where a delta quantization parameter in FIG. 25 is transformed into an arranged code number;

FIG. 39 is a diagram of an example of transform information encoding according to at least one embodiment of the present disclosure;

FIG. 41 is a diagram of an example of encoding transform information of a subblock C in FIG. 39 by using a tree structure;

FIG. 42 is a diagram of another example of encoding transform information of a subblock C in FIG. 39 by using a tree structure.

DETAILED DESCRIPTION

Some embodiments of the present disclosure provide improvement of video compression efficiency by efficiently encoding encoding information used to encode a video and encoding a video by selectively using various encoding schemes and decoding schemes.

A video encoding apparatus (or a video encoder) and a video decoding apparatus (or a video decoder) according to embodiments of the present disclosure may be a personal computer (PC), a notebook or laptop computer, a personal digital assistant (PDA), a portable multimedia player (PMP), a PlayStation Portable (PSP), or a mobile communication terminal, a smart phone, or the like, and represent a variety of apparatuses equipped with, for example, a communication device such as a modem for performing communications between various devices or wired/wireless communication networks, a memory for storing various programs for encoding or decoding videos and relevant data, and a microprocessor for executing the programs to perform operations and controls.

In addition, the video encoded into a bitstream by the video encoding apparatus may be transmitted in real time or non-real-time to the video decoding apparatus for decoding the same where it is reconstructed and reproduced into the video after being transmitted via a wired/wireless communication network including the Internet, a short range wireless communication network, a wireless LAN network, WiBro (Wireless Broadband) also known as WiMax network, and mobile communication network or a communication interface such as cable or USB (universal serial bus).

Although it will be described below that an input video is divided in units of a macroblock prior to encoding and decoding, the embodiments of the present disclosure are not limited thereto. For example, the input video may be divided not into regular blocks such as macroblocks but into various irregular regions such as circles, trapezoids, and hexagons, and then encoded and decoded in units of the divided region.

Figure 1:
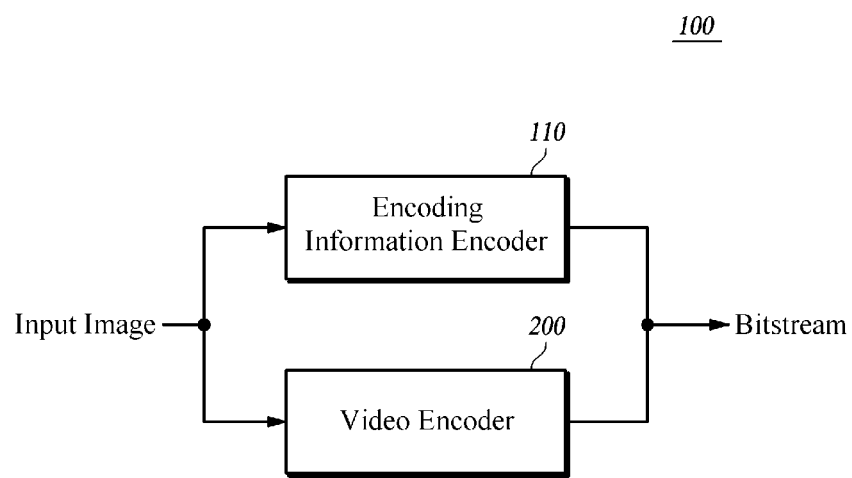
FIG. 1 is a block diagram of a schematic configuration of a video encoding apparatus according to at least one embodiment of the present disclosure.

FIG. 1 is a block diagram illustrating a schematic configuration of a video encoding apparatus according to an embodiment of the present disclosure.

A video encoding apparatus 100 according to an embodiment of the present disclosure may include an encoding information encoder 110 and a video encoder 200. Other components of the video encoding apparatus 100, such as the encoding information encoder 110 and the video encoder 200 comprise one or more processors and/or application-specific integrated circuits (ASICs) specified for respectively corresponding operation and functions described herein after. The video encoding apparatus 100 further comprises input units (not shown in FIG. 1) such as one or more buttons, a touch screen, a mic and so on, and output units (not shown in FIG. 1) such as a display, an indicator and so on. The video encoding apparatus 100 further comprises communication modem(s) to receive and/or communication signals to thereby communicate with a video decoding apparatus (or video decoder) through wire or wireless networks (herein, the wire or wireless networks include, for example, one or more network interfaces including, but not limited to, cellular, Wi-Fi, LAN, WAN, CDMA, WCDMA, GSM, LTE and EPC networks, and cloud computing networks).

The video information encoder 110 encodes block mode information indicating whether a block mode of a block of a video to be encoded is a skip mode, and partition mode information indicating whether the block is divided into subblocks, and encodes skip motion information of the block or prediction encoding information including block type information and prediction information of the block according to a combination of the block mode information and the partition mode information.

In an embodiment of the present disclosure, encoding information is not pixel information of a video encoded in units of a block, but additional information used to encoding the pixel information. Examples of the encoding information may include block mode information of a block, partition mode information, skip motion information, block type information, prediction information, prediction encoding information, transform type information, coded block pattern (CBP) information, delta quantization parameter information, and the skip type information.

The block mode information is information indicating whether a block mode of a block is a skip mode. The block mode may include a skip mode and a non-skip mode that indicate whether a block is to be skipped without being encoded or to be encoded without being skipped. The block mode information may be embodied, for example, by a 1-bit skip block flag indicating that a block mode of a block is a skip mode or a non-skip mode, but is not limited thereto and may be embodied by various other methods.

The skip mode is a mode that does not encode specific information such as block type information, motion information, or transform coefficient information.

For example, if or when a block mode of a block in an input video to be currently encoded is a skip mode, the video encoding apparatus 100 may encode only information indicating the skip mode, without encoding other information such as block type information, motion information, and transform coefficient information.

As another example, the skip mode may be a mode that encodes only motion information of a block without encoding other information such as type information and transform coefficient information.

As another example, the skip mode may be a mode that encodes only transform type information and transform coefficient information of a block without encoding type information and motion information.

As another exemplary embodiment, non-transmitted information may be different between respective block sizes in the skip mode. For example, if or when a 64×64 block is a skip mode, only transform coefficient information may be encoded; and if or when a 16×16 block is a skip mode, only motion information may be encoded.

The partition mode information is information indicating whether a block is divided into smaller subblocks.

For example, if or when a block in an input video to be currently encoded by the video encoding apparatus 100 is a 64×64 pixel macroblock, the 64×64 pixel macroblock may be divided into subblocks of various size and number such as two 64×32 pixel subblocks, one 64×32 pixel subblock, two 32×32 pixel subblocks, and four 32×32 pixel subblocks, and encoded by the unit of subblock. In this case, the partition mode information indicates whether the macroblock is divided into subblocks prior to encoding. The partition mode information may be embodied, for example, by a 1-bit partition flag indicating that a block is divided into subblocks, but is not limited thereto and may be embodied by various other methods.

As another example, the partition mode information is information indicating a block is divided into smaller subblocks of a predetermined size.

For example, if or when a block in an input video to be currently encoded by the video encoding apparatus 100 is a 64×64 pixel macroblock, the 64×64 pixel macroblock may be divided into sixteen 16×16 blocks through a 1-bit flag indicating whether it is divided into 16×16 blocks subblocks. In addition, each of the 16×16 blocks may be may be divided into smaller subblocks, and it may be encoded through information indicating the shape of a subblock (partition type information).

If or when a block mode of a block to be encoded is a skip mode, the skip motion information is a motion vector determined by motion-estimating the block, a difference vector between the motion vector of the block and a predicted motion vector of the block, and/or a reference picture index. Specifically, if or when a block mode of the block is a skip mode, the video encoding apparatus 100 encodes only skip motion information of the block without encoding coefficient information of the block. In this case, a video decoding apparatus to be described later reconstructs the skip motion information and reconstructs the block by compensating a motion of the block by using the reconstructed skip motion information.

As another exemplary embodiment of the skip mode, a skip mode is applied only when a reference picture index to be encoded is 0, and if or when a block mode of a block is skip mode, the video encoding apparatus 100 encodes only a motion vector determined by motion-estimating the block or a difference vector between the motion vector of the block and a predicted motion vector of the block, without encoding a reference picture index and motion information of the block. The video decoding apparatus to be described later reconstructs only the determined motion vector or the difference vector between the motion vector of the block and the predicted motion vector, and reconstructs the block by motion-compensating the block by setting the reference picture index to 0 (that is, an immediately previously reconstructed picture is used as a reference picture).

As another exemplary embodiment of the skip mode, in determining a predicted motion vector of a block to be encoded, if or when one or more the motion vectors of an upper block and a left block of a block to be currently encoded are a zero-vector (that is, {0,0}, a zero-vector may be used as the predicted motion vector. In other cases, a median value of the motion vectors of upper, left and upper-right blocks is used as the predicted motion vector. If or when a block to be currently encoded is a skip mode, when a motion vector of an upper or left block is {0,0} in determining a predicted motion vector, the video decoding apparatus to be described later uses {0,0} as a predicted motion vector and reconstructs the block by reconstructing a reconstructed difference vector and performing motion compensation.

As another exemplary embodiment, different predicted motion vectors may be different between respective block sizes. For example, for a block larger than 16×16, a median vector is used as a predicted motion vector regardless of a vector value of an upper block and a left block of a block to be currently encoded. For a 16×16 block, if or when a vector of an upper block or a left block of a block to be currently encoded is (0,0), a zero-vector is used as a predicted vector. In other cases, a median vector of three motion vectors of a left block, an upper block, and an upper-left block is used as a predicted motion vector (vice versa).

If or when a block mode of a block to be encoded is not a skip mode, the block type information indicates whether the block is an inter block or an intra block, and a partition type of a subblock of the block.

As an example, the block type information may be encoded in units of a macroblock, and may include a 1-bit block type flag indicating whether the macroblock is an inter macroblock or an intra macroblock, and partition type information indicating a partition type of a subblock of the block. For example, the block type flag may be represented by a 1 or 0 binary bit indicating whether the block is an inter macroblock or an intra macroblock. The partition type information may be represented by each partition type number of a subblock. As another example, the partition type information may be encoded in units of a 16×16 pixel size, and indicates that all the subblocks in a current block are an intra mode if or when a current 16×16 block is an intra block.

As another example, the block type information may include a 1-bit block type flag indicating whether the block is an inter macroblock or an intra macroblock, partition type information indicating a partition type of a subblock of the block, and a 1-bit skip subblock flag indicating whether a block mode of a subblock is a skip mode. Herein, the skip subblock flag indicates whether each subblock of the block is a skip mode, and indicates that, if or when a subblock is a skip mode, the subblock is skipped without being encoded. That is, if or when a subblock among the subblocks of a block to be encoded is a skip mode, motion information and coefficient information of the subblock are not encoded.

As another example, the block type information may be embodied by a block type number that is allocated to a plurality of available block types according to the block is an inter block or an intra block and a partition type of a subblock of the block.

In addition, the block type information may indicate a block type of a block to be encoded according to the partition mode information, or may indicate a block type of each subblock of a block to be encoded. For example, if or when the partition mode information indicates that a block to be encoded is not divided into subblocks, the partition type information indicates whether a block to be encoded is an inter macroblock or an intra macroblock and a partition type of the block (that is, a type of a macroblock that is not divided); and if or when the partition mode information indicates that a block to be encoded is divided into subblocks, the partition type information indicates whether each subblock of a block to be encoded is an inter block or an intra block and a partition type of the subblocks of the block.

The prediction information is information used to prediction-encode a block to be encoded or each subblock of the block. The prediction information may be information on an intra prediction mode for intra prediction encoding, and may be information on a motion vector for inter prediction encoding and information on a reference picture index.

The transform type information is information on a transform unit by which a block to be encoded or each subblock of the block is transformed and quantized. For example, if or when a 64×64 pixel block is encoded without being divided any more and 16×16 transform is determined to be efficient, information indicating the use of 16×16 transform may be encoded as the transform type information.

The CBP information is information indicating whether a block to be encoded or respective subblocks of the block are all 0, and the delta quantization parameter information is information indicating a quantization parameter of a block to be encoded or each subblock of the block.

The above-described block mode information, partition mode information, block type information, prediction information, partition type information, CBP information, and delta quantization parameter information may be determined by analyzing an input video through the encoding information encoder 110 or by analyzing an input video through the video encoder 200.

The video encoder 200 encodes coefficient information of a block based on block type information and prediction information of the block. For example, if or when the block mode information indicates that a block mode of a block to be encoded is not a skip mode and the block type information indicates that the block is divided into subblocks of various shape and size, the video encoder 200 encodes coefficient information of the block by intra-prediction-encoding or inter-prediction-encoding each subblock according to each subblock prediction information. Herein, the coefficient information is information on a quantized transform coefficient that is generated by predicting a luma component and/or a chroma component of a block of a video to be encoded and transforming/quantizing a residual block thereof. The coefficient information is encoded and included in a bitstream as texture data.

Figure 2:
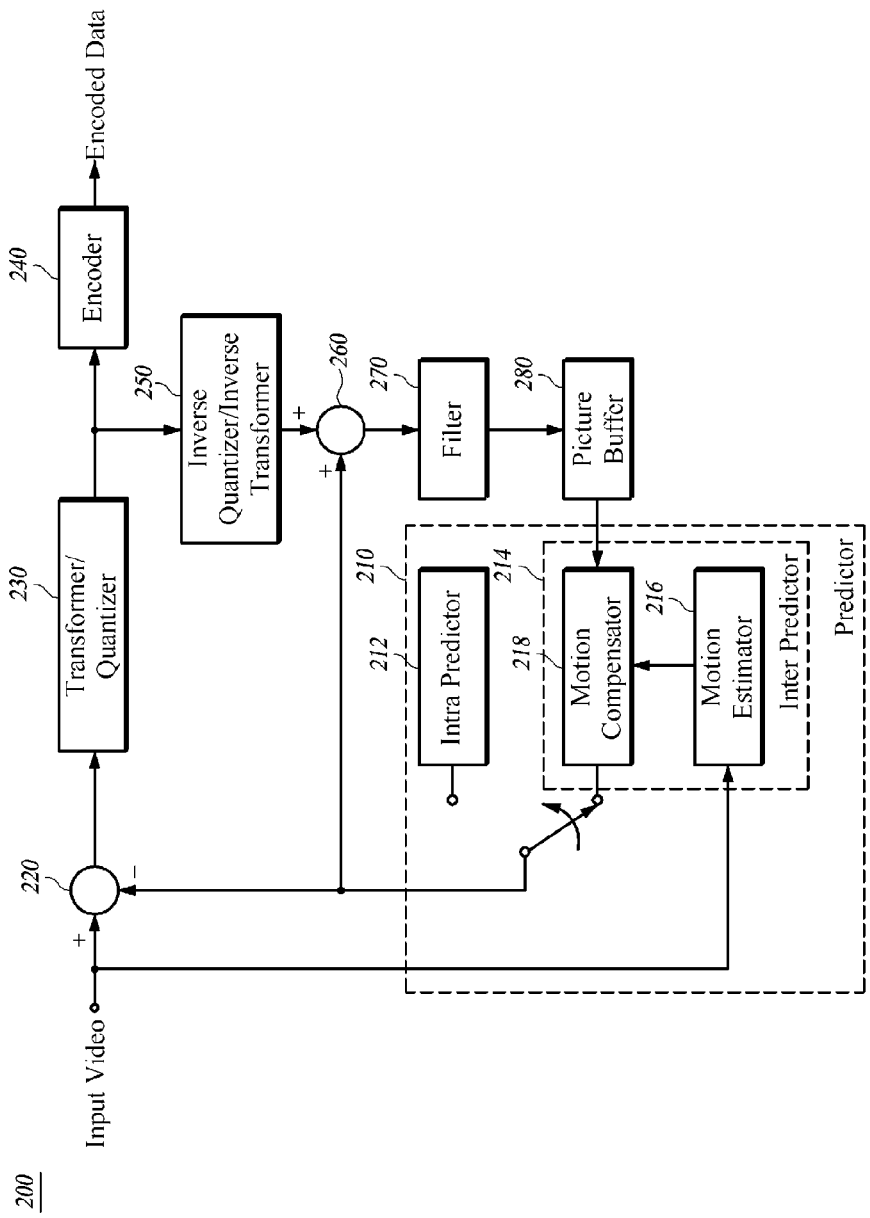
FIG. 2 is a diagram of a schematic configuration of a video encoder in FIG. 1.

FIG. 2 is a diagram illustrating a schematic configuration of a video encoder 200 according to at least one embodiment of the present disclosure. Referring to FIG. 2, the video encoder 200 may include a predictor 210, a subtracter 220, a transformer/quantizer 230, an encoder 240, an inverse quantizer/inverse transformer 250, an adder 260, a filter 270, and a picture buffer 280. Other components of the video encoder 200, such as the predictor 210, the subtracter 220, the transformer/quantizer 230, the encoder 240, the inverse quantizer/inverse transformer 250, an adder 260 and the filter 270 comprise one or more processors and/or application-specific integrated circuits (ASICs) specified for respectively corresponding operation and functions described herein after. The video encoder 200 further comprises input units (not shown in FIG. 2) such as one or more buttons, a touch screen, a mic and so on, and output units (not shown in FIG. 2) such as a display, an indicator and so on. The video encoder 100 further comprises communication modem(s) to receive and/or communication signals to thereby communicate with a video decoding apparatus (or a video decoder) through wire or wireless networks (herein, the wire or wireless networks include, for example, one or more network interfaces including, but not limited to, cellular, Wi-Fi, LAN, WAN, CDMA, WCDMA, GSM, LTE and EPC networks, and cloud computing networks). The picture buffer 280 includes one or more non-transitory computer readable recording medium.

The predictor 210 may include an intra predictor 212 and an inter predictor 214. The inter predictor 214 may include a motion estimator 216 and a motion compensator 218.

An input picture comprised of one picture or frame of a moving picture is divided into macroblocks having N×N pixels (N: an integer equal to or greater than 16), and the macroblocks are inputted to the video encoding apparatus 100 of FIG. 1. If or when an input video is a video of 4:2:0 format, a macroblock is comprised of a luminance block having N×N pixels and a chrominance block having two (M/2)×(N/2) pixels. Herein, the macroblock includes not only a 16×16 pixel block but also a 32×32 pixel block and a 64×64 pixel block. A macroblock larger than a 16×16 pixel block is also called an extended macroblock.

Figure 3:
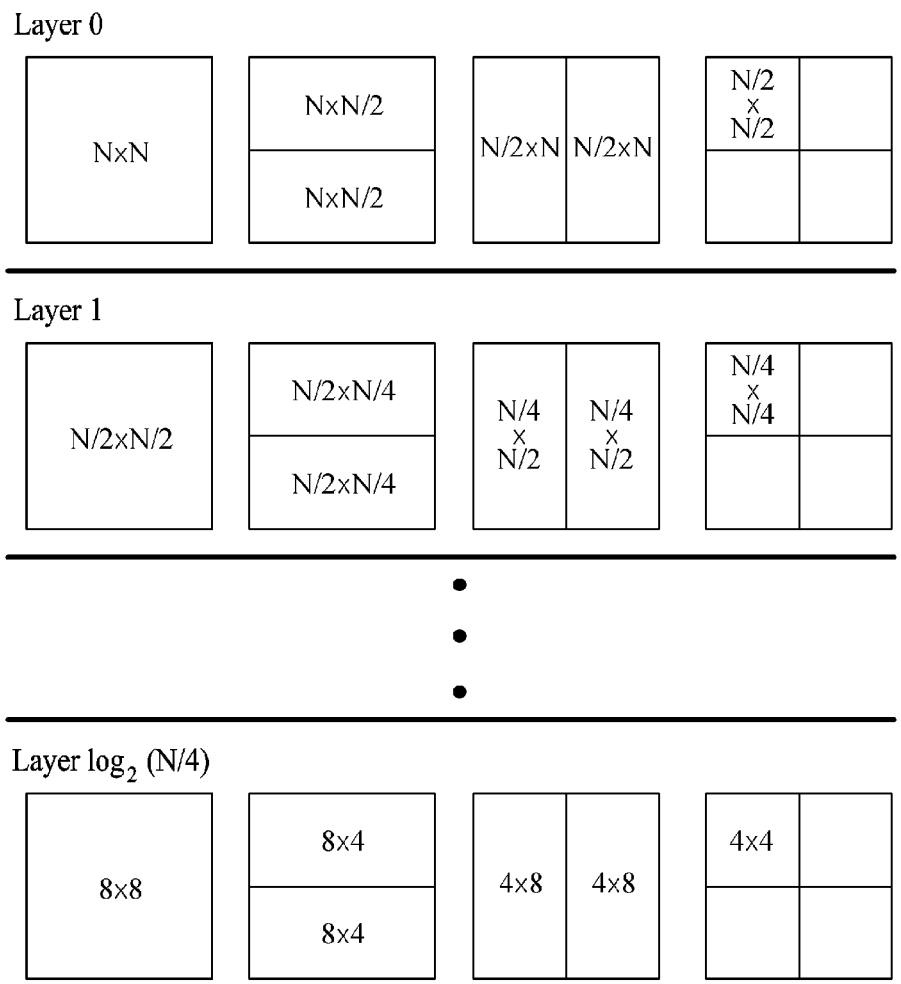
FIG. 3 is an diagram of a macroblock and subblocks of various sizes for intra prediction encoding and inter prediction encoding according to at least one embodiment of the present disclosure.

As illustrated in FIG. 3, each macroblock may be divided into smaller subblocks prior to intra prediction encoding or inter prediction encoding.

FIG. 3 is an illustrating diagram illustrating a macroblock and subblocks of various sizes for intra prediction encoding and inter prediction encoding according to an embodiment of the present disclosure.

FIG. 3 illustrates a macroblock and subblocks when N is an integer equal to or greater than 16 and the minimum block size is 4×4 pixels. If or when a macroblock is a 64×64 pixel block, a 64×64 pixel block, 64×32 pixel block, 32×64 pixel block, and a 32×32 pixel block being subblocks may belong to a macroblock layer 0, and a 32×32 pixel block, a 32×16 pixel block, 16×32 pixel block, and 16×16 pixel block being subblocks may belong to a macroblock layer 1. Herein, the subblocks of a macroblock layer K+1 may be used only if or when the largest subblock among the subblocks of a macroblock layer K ($0 \leq K \leq \log_2(N/4)$) is divided into four blocks.

The video encoding apparatus 100 may calculate an encoding efficiency of each subblock in the case of dividing a macroblock into subblocks, and determine a subblock with the highest encoding efficiency as a final intra predicted block or inter predicted block. The encoding efficiency may be measured based on a rate-distortion optimization (RDO) technique.

A minimum block size may be determined according to a maximum layer value (MaxLayer) that is a maximum available layer value. For example, in the case of an N×N pixel macroblock, a minimum block size may be determined as $N/(2^{MaxLayer})$.

Figure 4:
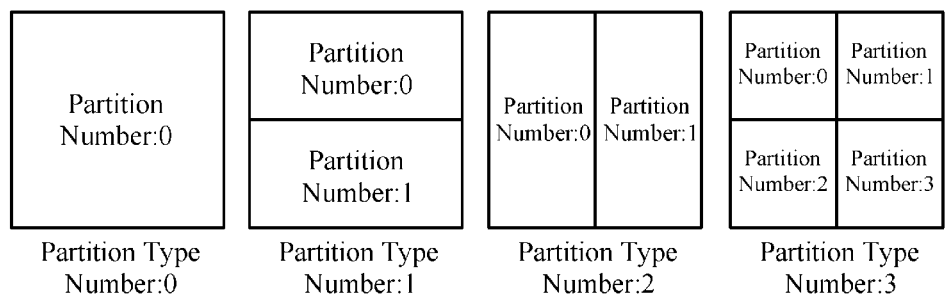
FIG. 4 is an diagram of a number of each partition type according to at least one embodiment of the present disclosure.

FIG. 4 is an illustration diagram illustrating a number of each partition type according to an embodiment of the present disclosure.

Referring to FIG. 4, if or when an $N/2^K \times N/2^K$ pixel block of a macroblock layer K is not divided any more, a partition type number 0 is allocated to the $N/2^K \times N/2^K$ pixel block of the macroblock layer K. If or when the $N/2^K \times N/2^K$ pixel block of the macroblock layer K is divided into two $N/2^K \times N/2^{K+1}$ pixel blocks, a partition type number 1 is allocated to the $N/2^K \times N/2^K$ pixel block of the macroblock layer K. If or when the $N/2^K \times N/2^K$ pixel block of the macroblock layer K is divided into two $N/2^{K+1} \times N/2^K$ pixel blocks, a partition type number 2 is allocated to the $N/2^K \times N/2^K$ pixel block of the macroblock layer K. If or when the $N/2^K \times N/2^K$ pixel block of the macroblock layer K is divided into four $N/2^{K+1} \times N/2^{K+1}$ pixel blocks, a partition type number 3 is allocated to the $N/2^K \times N/2^K$ pixel block of the macroblock layer K. In FIG. 3, the numbers 0, 1, 2 and 3 marked on the respective subblocks in the $N/2^K \times N/2^K$ pixel block of the macroblock layer K are partition numbers for identifying the respective subblocks.

Figure 5:
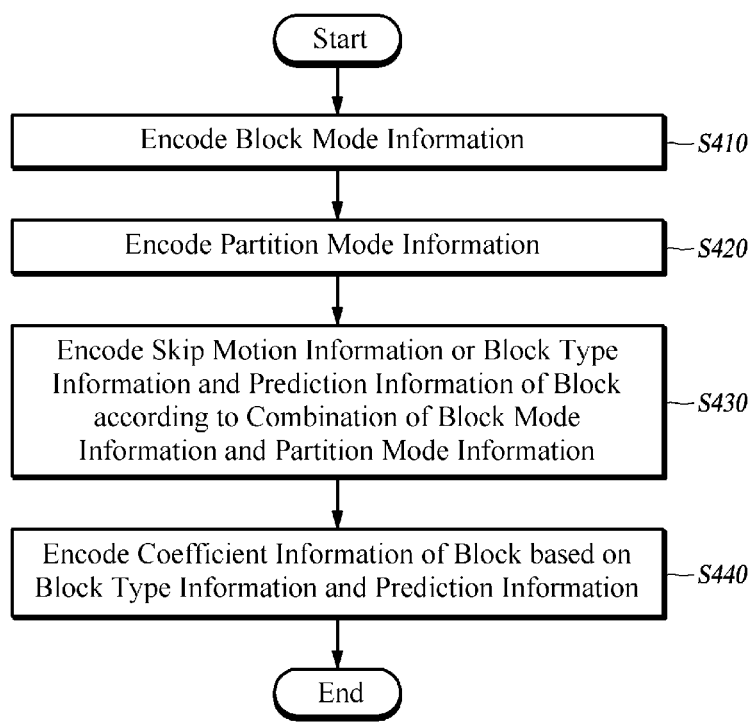
FIG. 5 is a flow diagram of a video encoding method according to at least one embodiment of the present disclosure.

FIG. 5 is a flow diagram illustrating a video encoding method according to an embodiment of the present disclosure.

In a video encoding method according to an embodiment of the present disclosure, the video encoding apparatus 100 encodes block mode information indicating whether a block mode of a block of a video to be encoded (S510). Specifically, the video encoding apparatus 100 determines whether to encode coefficient information of a block to be encoded or to encode only motion information of the block without encoding coefficient information of the block. If or when only motion information of the block is encoded, the video encoding apparatus 100 encodes block mode information indicating that the block mode is a skip mode; and if or when not only motion information of the block but also coefficient information of the block are encoded, the video encoding apparatus 100 encodes block mode information indicating that the block mode is not a skip mode.

The video encoding apparatus 100 encodes partition mode information indicating whether the block is divided into subblocks (S520). Specifically, the video encoding apparatus 100 determines whether to divide a block to be encoded into smaller subblocks and encode the same in units of the subblock or to encode the block without dividing the same into smaller subblocks. If or when the block is encoded without being divided into smaller subblocks, the video encoding apparatus 100 encodes partition mode information indicating that the block is not divided into subblocks; and if or when the block is divided into smaller subblocks prior to encoding, the video encoding apparatus 100 encodes partition mode information indicating that the block is divided into subblocks. For example, if or when a block to be encoded is a 64×64 pixel macroblock, the video encoding apparatus 100 determines whether to divide the 64×64 pixel macroblock into 16×16 pixel subblocks prior to encoding or to encode the 64×64 pixel macroblock without dividing the same into 16×16 pixel subblocks, and encodes partition mode information accordingly. If or when the 64×64 pixel macroblock is divided into 16×16 pixel subblocks prior to encoding, the respective 16×16 pixel blocks may be divided into smaller subblocks and a block type is encoded and transmitted to a decoder.

The video encoding apparatus 100 encodes skip motion information of the block or prediction encoding information including block type information of the block and prediction information of the block according to a combination of block mode information and partition mode information (S5300, and encodes coefficient information of the block based on the block type information and the prediction information (S540). Specifically, the video encoding apparatus 100 encodes the block in different ways according to the respective cases corresponding to a combination of whether the block mode information indicates that a block mode of a block to be encoded is a skip mode and whether the partition mode information indicates that the block is divided into subblocks.

Hereinafter, a process of performing step S530 and step S540 by the video encoding apparatus 100 will be described assuming that a block to be encoded is a 64×64 pixel macroblock and is divided into 16×16 pixel subblocks.

In step S530, if or when the block mode information indicates that a block mode of the block is a skip mode and the partition mode information indicates that the block is not divided into subblocks, the video encoding apparatus 100 may encode a skip motion vector of the block. Specifically, the video encoding apparatus 100 motion-estimates a block to be encoded in units of 64×64 pixels to detect a reference block, which is most similar to the block to be encoded, in a reference picture, determines a motion vector indicating a relative position of the reference block and the block to be encoded as a skip motion vector, determines a reference picture index indicating the reference picture including the reference block as a skip reference picture index, and encodes skip motion information including the skip motion vector and the skip reference picture index.

In step S530, if or when the block mode information indicates that a block mode of the block is a skip mode and the partition mode information indicates that the block is divided into subblocks, the video encoding apparatus 100 may encode a skip motion vector of the block to be encoded. Specifically, the video encoding apparatus 100 motion-estimates each subblock of a block to be encoded in units of 64×64 pixels to detect a reference subblock, which is most similar to each subblock of the block to be encoded, in a reference picture, determines a motion vector indicating a relative position of the reference subblock and each subblock of the block to be encoded as a skip motion vector, determines a reference picture index indicating the reference picture including the reference subblock as a skip reference picture index, and encodes skip motion information including the skip motion vector and the skip reference picture index. Thus, if the block mode information indicates that a block mode of the block is a skip mode and the partition mode information indicates that the block is divided into subblocks, the skip motion information is encoded as many as the number of respective subblocks.

In step S530 and step S540, if or when the block mode information indicates that a block mode of the block is not a skip mode and the partition mode information indicates that the block is not divided into subblocks, the video encoding apparatus 100 may encode prediction encoding information including block type information and prediction information of the block. Specifically, the video encoding apparatus 100 motion-estimates a block to be encoded in units of 64×64 pixels to detect a reference block, which is most similar to the block to be encoded, in a reference picture, determines a motion vector indicating a relative position of the reference block and the block to be encoded, determines a reference picture index indicating the reference picture including the reference block, encodes coefficient information obtained by transforming/quantizing a residual block between the block to be encoded and a predicted block generated by compensating a motion of the block to be encoded based on the determined motion vector, and also encodes block type information and prediction information used in prediction encoding.

In step S530 and step S540, if or when the block mode information indicates that a block mode of the block is not a skip mode and the partition mode information indicates that the block is divided into subblocks, the video encoding apparatus 100 may encode prediction encoding information including block type information and prediction information of each subblock of the block. Specifically, if or when a block type of a subblock of a block to be encoded is an inter block, each subblock of the block to be encoded may be divided into 16×16, 16×8, 8×16 or 8×8 pixel subblocks. If or when a 16×16 block is divided into four 8×8 pixel subblocks, each 8×8 block may be divided into smaller 8×8, 8×4, 4×8 or 4×4 subblocks. Specifically, the video encoding apparatus 100 performs motion estimation in units of a subblock size to detect a reference subblock, which is most similar to each subblock of the block to be encoded, in a reference picture, determines a motion vector indicating a relative position of the reference subblock and each subblock of the block to be encoded, determines a reference picture index indicating the reference picture including the reference subblock, encodes coefficient information obtained by transforming/quantizing a residual block between each subblock of the block to be encoded and a predicted subblock generated by compensating a motion of each subblock of the block to be encoded based on the determined motion vector of each subblock, and also encodes block type information and prediction information used in prediction encoding.

If or when a block type of a subblock of a block to be encoded is an intra block, the video encoding apparatus 100 determines an intra prediction mode of the subblock, and encodes coefficient information and prediction encoding information by performing prediction encoding based on the determined intra prediction mode. Thus, if or when the block mode information indicates that a block mode of the block is not a skip mode and the partition mode information indicates that the block is not divided into subblocks, the coefficient information and the prediction encoding information are encoded as many as the number of respective subblocks.

Herein, the block type information may be a block type number that is allocated to a plurality of available block types based on a partition type of a subblock of the block and whether the block is an inter macroblock or an intra macroblock. The prediction encoding information may further include one or more of transform type information of the subblock, CBP information of the subblock, and delta quantization parameter information of the subblock. The block type information may include a block type flag indicating whether the block is an inter macroblock or an intra macroblock and partition type information indicating a partition type of the subblock.

In addition, if or when the block mode information indicates that a block mode of a block to be encoded is not a skip mode and the partition mode information indicates that the block is divided into subblocks, the block type information may further include a skip subblock flag indicating whether a block mode of the subblock is skip mode, in addition to a block type flag indicating whether the block is an inter macroblock or an intra macroblock and partition type information indicating a partition type of the subblock of the block. Specifically, if or when a block mode of a block to be encoded is not a skip mode and the block is divided into subblocks, the video encoding apparatus 100 may not necessarily encode coefficient information and prediction encoding information of each subblock. If or when a block mode of a subblock is a skip mode, the video encoding apparatus 100 may encode only a skip subblock flag.

In step S530, the video encoding apparatus 100 may encode the partition type information when encoding the block type information. For example, the video encoding apparatus 100 may group a plurality of subblocks in units of a predetermined region, repeat a process of allocating a minimum value of the partition type value of the subblocks included in the grouped region as a partition type value of the grouped region up to the uppermost layer in units a layer, and encode the partition type information by encoding a difference value between the partition type value grouped in units of a layer and the partition type value of the grouted region of the upper layer. A method of encoding the partition type information by the video encoding apparatus 100 will be described below in detail with reference to FIGS. 7 and 8.

FIG. 6 is an illustration diagram illustrating a syntax structure of a bitstream encoded according to an embodiment of the present disclosure.

When the video encoding apparatus 100 encodes a block of an input video to be encoded by the above-described video encoding method according to an embodiment of the present disclosure, a bitstream having a syntax structure illustrated in FIG. 6 may be generated. In FIG. 6, a bitstream of a block to be encoded is illustrated.

FIG. 6A illustrates a syntax structure of a bitstream in the event where a block mode is a skip mode. If or when a block mode of a block to be encoded is a skip mode, a bitstream generated by encoding the block may include a block mode information field, a partition mode information field, and a skip motion information field. Data generated by encoding block mode information is allocated to the block mode information field, data generated by encoding partition mode information is allocated to the partition mode information field, and data generated by encoding skip motion information is allocated to the skip motion information field.

If or when the block mode is a skip mode, both when a partition mode of the block identified by partition mode information is divided into subblocks and when the partition mode is not divided into subblocks, coefficient information of the block is not encoded and only skip motion information corresponding to information on a motion determined by motion-estimating the block is encoded, and the result is allocated to the skip motion information field. In this case, if or when the partition mode indicates that the block is not divided into subblocks, motion information determined by motion-estimating the block is encoded as skip motion information; if or when the partition mode indicates that the block is divided into subblocks, motion information of each subblock determined by motion-estimating each subblock of the block is encoded as skip motion information; and the result is allocated to the skip motion information field.

FIG. 6B illustrates a syntax structure of a bitstream in the event where a block mode is not a skip mode. If or when a block mode of a block to be encoded is not a skip mode, a bitstream generated by encoding the block may include a block mode information field, a partition mode information field, a block type information field, a prediction information field, a CBP subblock flag field, a transform type information field, a CBP field, a delta QP field, and a coefficient information field. Herein, the CBP subblock flag field, the transform type information field, the CBP field, and the delta QP field is not necessarily included in the bitstream, and some or all of the fields may be selectively included in the bitstream according to embodiments.

Data generated by encoding block mode information is allocated to the block mode information field, and data generated by encoding partition mode information is allocated to the partition mode information field. If or when the block mode is not a skip mode, both when a partition mode of the block identified by partition mode information is divided into subblocks and when the partition mode is not divided into subblocks, coefficient information of the block is encoded. Thus, in this case, not only data generated by encoding coefficient information but also data generated by encoding prediction encoding information used to encode the coefficient information are included in the bitstream. The prediction encoding information may include block type information and prediction information and may further include a CBP subblock flag, transform type information, CBP, and delta QP.

If or when the partition mode information indicates that the block is not divided into subblocks, the prediction encoding information of only the block is encoded and allocated to each field; and if or when the partition mode information indicates that the block is divided into subblocks, the prediction encoding information of each subblock of the block is encoded and allocated to each field. Data generated by encoding coefficient information of the block or a subblock of the block is allocated to the coefficient information field.

Figure 7:
FIGS. 7 and 8 are diagrams of a process of encoding partition type information by using a tree structure according to at least one embodiment of the present disclosure.
Figure 8:
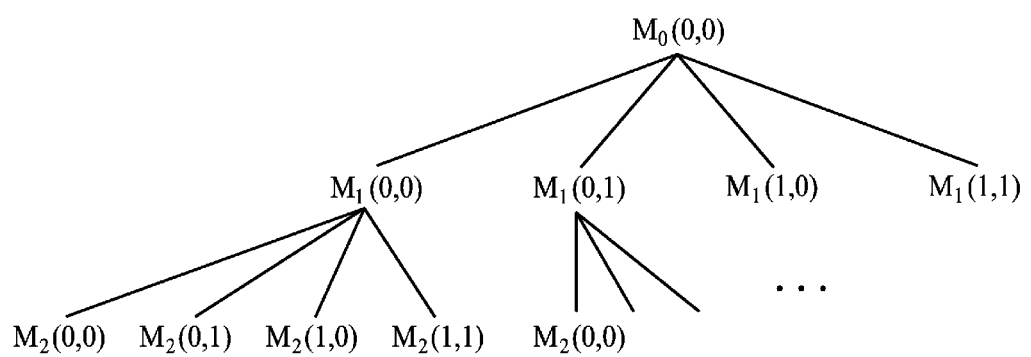

FIGS. 7 and 8 are illustration diagrams illustrating a process of encoding partition type information by using a tree structure according to an embodiment of the present disclosure.

In FIG. 7, a partition type value for each subblock of a block to be encoded in order to encode partition type information by using a tree structure is grouped in units of a predetermined region, and it is represented as a layer-by-layer partition type value.

FIG. 7A illustrates each subblock in a block to be encoded and a partition type value of each subblock. In FIG. 7A, $M_x(a,b)$ denotes a partition type value of a subblock corresponding to a position of (a,b) in a block to be encoded. Specifically, $M_x(0,0)$ denotes a partition type value of a subblock corresponding to a position of (0,0) in a block to be encoded (that is, the first subblock in a raster-scan direction in the block), and $M_x(0,1)$ denotes a partition type value of a subblock corresponding to a position of (0,1) in the block (that is, the second subblock in the raster-scan direction in the block).

The partition type values of subblocks illustrated in FIG. 7A are grouped in units of a predetermined region (for example, in units of a region including two or more subblocks), and a minimum value of the partition type values in the grouped region is selected and allocated as a partition type value for the grouped region.

FIG. 7B illustrates the result of grouping the partition type values of subblocks illustrated in FIG. 7A and allocating a minimum value as a partition type value of the grouped region. For example, regions including subblocks (0,0), (0,1), (1,0) and (1,1) illustrated in FIG. 7A are set and grouped in units of a predetermined region, and a minimum value among the partition type values $M_x(0,0)$, $M_x(0,1)$, $M_x(1,0)$ and $M_x(1,1)$ of the respective subblocks included in the grouped region is selected and allocated as a partition type value of the grouped region $M_{x-1}(0,0)$. In addition, regions including subblocks (0, 2), (0, 3), (1, 2) and (1, 3) are set and grouped in units of a predetermined region, and a minimum value among the partition type values $M_x(0,2)$, $M_x(0,1)$, $M_x(1,2)$ and $M_x(1,3)$ of the respective subblocks included in the grouped region is selected and allocated as a partition type value of the grouped region $M_{x-1}(0,1)$. In this manner, the same process is performed on the remaining subblocks. When a process of allocating the partition type values of subblocks illustrated in FIG. 7A as the partition type values of the grouped regions illustrated in FIG. 7B is repeated up to layers $M_{x-2}$, $M_{x-3}$ . . . $M_1$, the partition type values of grouped regions may be allocated as illustrated in FIG. 7C. When the process is again repeated up to a layer M0, the grouping may be made to have a partition type value of one grouped region as illustrated in FIG. 7D.

Although FIG. 7 illustrates that the predetermined region is set to a region including four adjacent subblocks, the present disclosure is not limited thereto. For example, the partition type values may be allocated after grouping the subblocks in various ways such as a region including eight adjacent subblocks and a region including six non-adjacent subblocks.

The allocation of the partition type values of the subblocks of a block to be encoded as the partition type values of the grouped region as illustrated in FIG. 7 may be represented in a tree structure as illustrated in FIG. 8.

FIG. 8 illustrates partition type values of layer-by-layer grouped regions in a tree structure. If or when the partition type value of the layer-by-layer grouped region is a node value, the node values in a tree structure illustrated in FIG. 8 may be encoded by encoding a difference from the node value of an upper node.

The method of encoding a difference value between the node values and the node value of an upper node encodes a binary bit 0 corresponding to the difference value and encodes the last binary bit 1. If or when the difference between the node value of an upper node and the node value of a node to be encoded is 0, a binary bit 1 is encoded. For example, an arithmetic coding method may be used in decoding a binary bit of 0 and 1. In this case, different contexts may be used in the respective layers.

In this manner, when a tree structure is used to encode a partition type value (i.e., a node value), a node value of the uppermost node (hereinafter referred to as 'uppermost node value') may be encoded as in the following three examples. As an example, a difference value between 0 and the uppermost node value may be encoded by using a binary bit of 0 and 1 as described above. As another example, if or when each partition type number is set to a partition type value and great partition type numbers are set in descending order of the occurrence frequency of partition type, a difference value between the uppermost node value and the greatest partition type number may be encoded by using a binary bit of 0 and 1. As another example, if or when each partition type number is set to a partition type value and small partition type numbers are set in descending order of the occurrence frequency of partition type, a difference value between the uppermost node value and the smallest partition type number may be encoded by using a binary bit of 0 and 1.

In the case of the remaining node values except the uppermost node value, a difference value between a node value of a node to be encoded and a node value of an upper node of the node may be encoded by using a binary bit of 0 and 1. That is, the respective node values may be encoded by encoding as many binary bits 0 as the difference value and encoding the last binary bit 1. In this case, if or when a difference value between a node value of a node to be encoded and a node value of an upper node of the node is 0, a binary bit 1 is encoded. In addition, on the contrary, the respective node values may be encoded by encoding as many binary bits 1 as the difference value and encoding the last binary bit 0. In this case, if or when a difference value between a node value of a node to be encoded and a node value of an upper node of the node is 0, a binary bit 0 is encoded.

However, when the respective node values are encoded, if or when the upper node value is the maximum value available for the partition type numbers, the node values of the lower nodes of the relevant upper node are not encoded. For example, if or when the node value of a node $M_1(0,0)$ is 3, the node values of the nodes $M_2(0,0)$, $M_2(0,1)$, $M_2(1,0)$ and $M_2(1,1)$ being the lower nodes of the node $M_1(0,0)$ are not encoded. That is, since $M_1(0,0)$ is the minimum value of $M_2(0,0)$, $M_2(0,1)$, $M_2(1,0)$ and $M_2(1,1)$, all of the $M_2(0,0)$, $M_2(0,1)$, $M_2(1,0)$ and $M_2(1,1)$ have a value greater than or equal to 3. However, in FIG. 4, since the maximum value of the partition type value is 3, the $M_2(0,0)$, $M_2(0,1)$, $M_2(1,0)$ and $M_2(1,1)$ need not be encoded because they cannot have a value other than 3.

In addition, when a difference value between a node to be encoded and an upper node of the node, if or when the node value of a node to be encoded is the maximum value available for the partition type numbers, only as many binary bits 0 as the difference value are encoded, and the last binary bit 1 is not encoded. For example, if or when the node value $M_1(0,0)$ of an upper node of a node to be encoded and the node values $M_2(0,0)$, $M_2(0,1)$, $M_2(1,0)$ and $M_2(1,1)$ of the node to be encoded are respectively 1, 2, 3, 3 and 2, the node values $M_2(0,0)$ and $M_2(1,1)$ encode binary bits 01, and the node values $M_2(0,1)$ and $M_2(1,0)$ encode binary bits 00, not binary bits 001.

In addition, when the node value of the last node among the nodes having the same upper node is encoded, if or when all of the node values of the nodes except the last node are greater than the node value of the upper node, the node value of the last node is not encoded. For example, if or when the node value $M_1(0,0)$ of an upper node of a node to be encoded and the node values $M_2(0,0)$, $M_2(0,1)$, $M_2(1,0)$ and $M_2(1,1)$ of the node to be encoded are respectively 1, 2, 3, 3 and 1, since all of the node values $M_2(0,0)$, $M_2(0,1)$ and $M_2(1,0)$ are greater than the node value $M_1(0,0)$, the node value $M_2(1,1)$ of the last node is not encoded.

As described above, the node values of the remaining nodes except the uppermost node may be encoded by encoding a difference value between the node value of a node to be encoded and the node value of an upper node of the node by using binary bits of 0 and 1. However, unlike this, the node values of the remaining nodes except the uppermost node may be encoded by encoding a difference value between the node value of each node and the partition type value highest in terms of the occurrence frequency of partition type. Herein, the partition type value highest in terms of the occurrence frequency may or may not be a fixed value. If or when the partition type value highest in terms of the occurrence frequency is not a fixed value, it may or may not be transmitted to a relevant decoder after being encoded. If or when the partition type value highest in terms of the occurrence frequency is not transmitted to the decoder, the statistics of the blocks encoded before the current block may be accumulated and the mode highest in terms of the occurrence frequency up to now may be used. In another embodiment of encoding partition type information by using a tree structure, when the partition type values illustrated in FIG. 7A are grouped to determine the partition type value of the grouped region illustrated in FIG. 7B, if or when great partition type numbers are allocated in descending order of occurrence frequency, the maximum value among the values of the grouped regions may be used as the partition type value of the grouped region.

Figure 10:
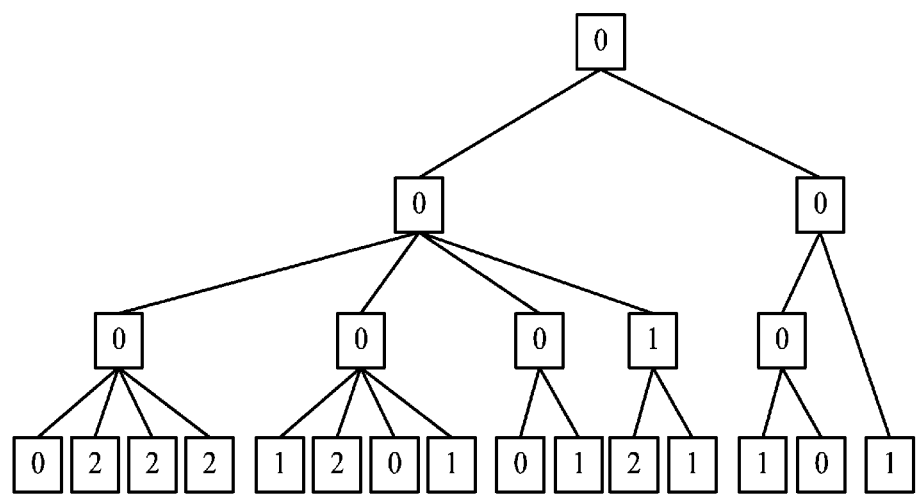

FIGS. 9 and 10 are diagrams illustrating an example of a tree structure according to an embodiment of the present disclosure. If or when partition type values of subblocks corresponding to a position (a,b) in a block to be encoded are {0, 2, 1, 2, 1, 2, 2, 0, 1, 0, 0, 1, 2, 1, 1} in a raster-scan direction as illustrated in FIG. 9A, the respective partition type values of the subblocks may be grouped in units of four adjacent subblocks. In this case, the leftmost or lowermost remainders may be grouped between the remainders even when they are not four subblocks. In this manner, if or when partition type values of subblocks illustrated in FIG. 9A are represented in units of a group, the first group, the second group, the third group, the fourth group, the fifth group, and the sixth group may be respectively {0, 2, 2, 2}, {1, 2, 0, 1}, {1, 0}, {0, 1}, {2, 1}, and {1} in the raster-scan direction. When a minimum value of the partition type value of the subblocks included in each group is selected and a partition type value of the grouped region, it may be {0, 0, 1, 0, 1, 1} in the raster-scan direction as illustrated in FIG. 9B. Like in the case of FIG. 9A, these partition type values may be grouped as four adjacent partition type values. When a minimum value is selected from the respective groups for partition type values illustrated in FIG. 9B and allocated as a partition type value of the grouped region, it may be {0, 1} in the raster-scan direction as illustrated in FIG. 9C. When a minimum value is finally selected and allocated as a partition type value, it may be 0 as illustrated in FIG. 9D. This process may be represented in a tree structure as illustrated in FIG. 10.

A method of encoding/decoding transform type information will be described below.

In encoding a transform type, a lowermost node is first generated according to a block mode. In this case, if or when the block mode is a skip mode, the node may not be generated. Next, a lowermost node is generated according to selection of a transform type. In this case, the unit or method of selecting the transform type may be encoded prior to transmission, so that the encoder and the decoder operate in the same way.

In encoding a transform type, a transform type of a macroblock may be selected and encoded in units of a 16×16 pixel block. In this case, subblocks in the 16×16 pixel block may use the same type of transform. That is, a transform type may be selected in units of a 16×16 block even in the case of a block larger than a 16×16 pixel block, and a transform type may be transmitted with respect to each 16×16 pixel block having a non-zero CBP16 flag. Herein, even when a 16×16 pixel block is divided into blocks smaller than an 8×8 pixel block, a transform type may be selected and encoded; and when a 16×16 pixel block is divided into blocks smaller than an 8×8 pixel block, a transform type may not be encoded by using a fixed transform (for example, a 4×4 pixel block).

Alternatively, a transform type may be selected in units of a block in the case of a block larger than a 16×16 pixel block, and a transform type may be selected and encoded in units of a 16×16 block if or when a block is divided into blocks smaller than a 16×16 pixel block.

In this case, encoding of a transform type may use Table 1 fixed regardless of the number of transforms selectable for each transform type, and may use Table 2 according to the number of selectable transforms.

TABLE 1

| Transform Type | Each Transform Type (code num) |
|---|---|
| 4 × 4 Transform | 0 |
| 8 × 8 Transform | 1 |
| 8 × 16, 16 × 8 or 16 × 16 Transform | 2 |

TABLE 2

| Transform Type | Each Transform Type (code num) |
|---|---|
| 4 × 4 Transform | 0 |
| 16 × 16, 16 × 8 or 8 × 16 | 1 |
| 8 × 8 Transform | 1 or 2 |
| | For 1: If there are two selectable transform types, it may have a value of 1 or 2 according a condition of an adjacent block. |
| | For 2: If there are three selectable transform types; it has a value of 2. |

FIGS. 11 and 12 are diagrams illustrating transform type encoding and decoding according to an embodiment of the present disclosure. FIG. 11 illustrates macroblock numbers in the case of selecting transform types in units of a relevant block with respect to blocks larger than a 16×16 pixel block and selecting transform types in units of a 16×16 pixel block if or when a block is divided into blocks smaller than a 16×16 pixel block. FIG. 12 illustrates each block mode and selected transform types with respect to FIG. 11. Herein, it is assumed that, if or when a subblock in a 16×16 pixel block is divided into blocks smaller than an 8×8 pixel block, a 4×4 transform is used and a transform type is encoded according to Table 1 fixed regardless of the number of transforms selectable for each transform type.

Referring to FIGS. 11 and 12, a macroblock number 0 is a skip mode. In addition, a macroblock number 1 includes a block having a CBP16 flag of 0 and blocks using an 8×8 transform, and a macroblock number 2 includes a block having a CBP16 flag of 0 and blocks using a 4×4 transform. A macroblock number 3 has a CBP32 flag of 1 and uses a 16×16 transform, and a macroblock number 4 includes blocks using a 16×8 transform, blocks using a 16×16 transform, and blocks using an 8×16 transform. In this case, since the remaining blocks of the macroblock number 4 are divided into blocks smaller than an 8×8 pixel block, a fixed 4×4 transform is used and a transform type may not be encoded. In addition, a macroblock number 5 includes blocks using a 4×4 transform and blocks divided into blocks smaller than an 8×8 pixel block. In this case, since the blocks divided into blocks smaller than an 8×8 pixel block use a 4×4 transform, a transform type may not be encoded. A macroblock number 6 has a CBP32 flag of 1 and uses a 4×4 transform, and a macroblock number 7 includes a block using an 8×8 transform, a block using a 4×4 transform, and a block that is a skip mode. In addition, a macroblock number 8 includes blocks using a 4×4 transform and blocks that is divided into blocks smaller than an 8×8 pixel block and use a 4×4 transform. In FIG. 12, blocks that do not encode a transform type are represented distinctively. Specifically, blocks represented by slant lines are skip blocks or blocks having a CBPX flag of 0, which have no transform coefficient. Blocks represented by cross stripes are blocks using a fixed transform, which need not transmit a transform type because the decoder can know a relevant transform type.

Figures 13, 14:
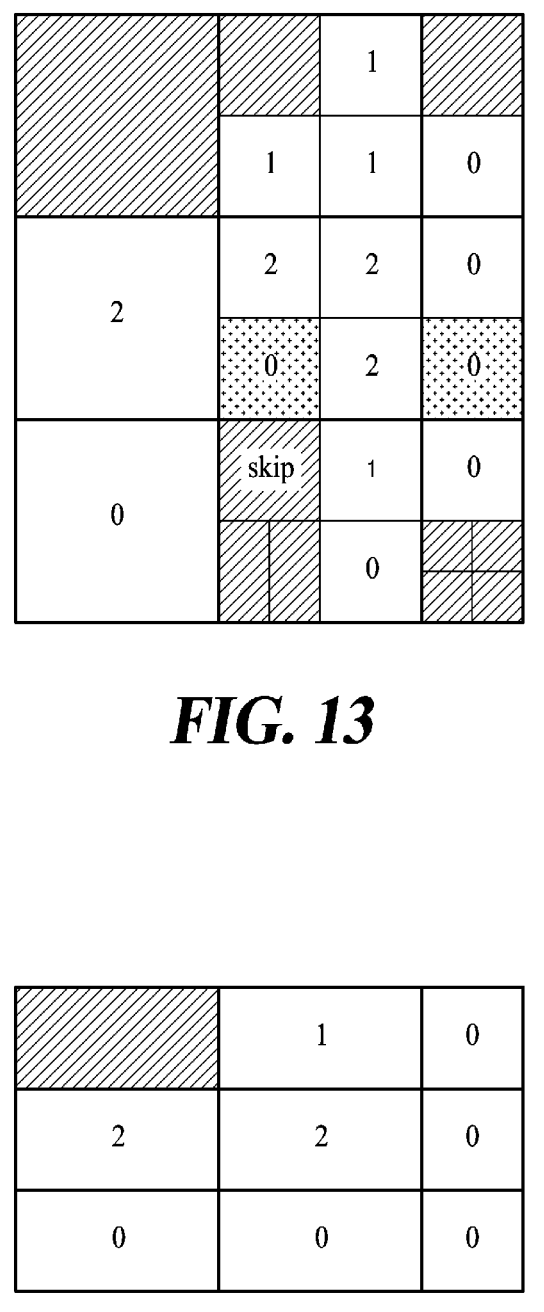
Figure 15:
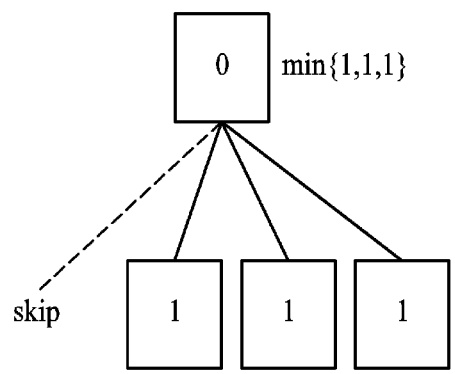
FIG. 15 is a diagram of an example of a tree structure for a macroblock number 1 in FIG. 11.
Figure 16:
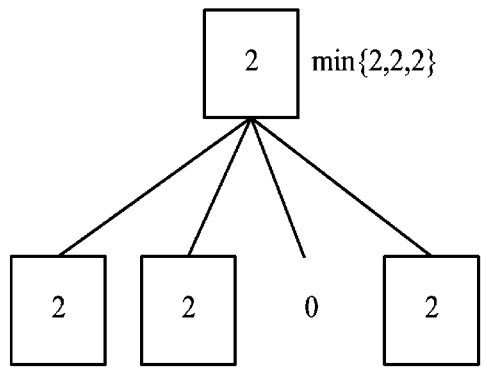
FIG. 16 is a diagram of an example of a tree structure for a macroblock number 4 in FIG. 11.
Figure 17:
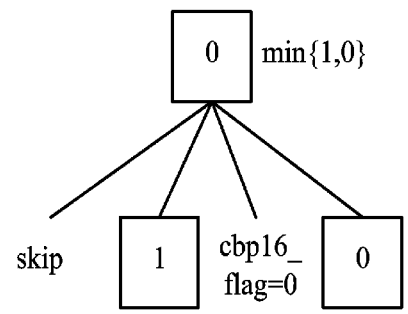
FIG. 17 is a diagram of an example of a tree structure for a macroblock number 7 in FIG. 11.

When Table 1 is applied to a transform type selected for each block of FIG. 12, the lowermost node value may be represented as illustrated in FIG. 13. When a minimum value is selected from the node values of the respective blocks illustrated in FIG. 13 and is allocated as a node value, the upper node may be obtained as illustrated in FIG. 14. For example, in FIG. 12, the macroblock number 0 has no encoding bit of a transform type. As for the macroblock number 1, since it has a lowermost node value of {1, 1, 1} as illustrated in FIG. 15, a minimum value 1 is allocated as the uppermost node value, an encoding bit 01 indicating a difference value between the uppermost node value 1 and 0 is encoded, and an encoding bit 111 indicating a difference value between the lowermost bit and the uppermost node value 1 is encoded. As for the macroblock number 2, since it has one node, a difference value between 0 and a transform type value 0 of the second 16×16 pixel block in a macroblock is encoded. In this case, the encoding bit may be represented by 1. As for the macroblock number 3, since it has a node type of a 32×32 pixel block, a difference value between 0 and a transform type value 2 of a 32×32 block is encoded. In this case, the encoding bit may be represented by 00. As for the macroblock number 4, since the third 16×16 block in the macroblock is divided into subblocks smaller than an 8×8 pixel block, a fixed transform type (for example, a 4×4 transform) is used and thus a transform type may not be encoded. Therefore, a node corresponding to the third 16×16 block is not generated, a node is generated only with respect to other three 16×16 pixel blocks, and only a difference value between the uppermost node value 2 and 0 is encoded. That is, as illustrated in FIG. 16, an uppermost node value being a minimum value is selected from a lowermost node value {2, 2, 2}, and an encoding bit 00 corresponding to a difference value between an uppermost node value 2 and 0 is encoded. As for the macroblock number 5, since the second 16×16 block in the macroblock is divided into subblocks smaller than an 8×8 pixel block, a fixed transform type (for example, a 4×4 transform) is used and a transform type may not be encoded. Thus, a node corresponding to the second 16×16 pixel block is not generated. In this case, since there is only one node, a difference value between 0 and a transform type value 0 of the first 16×16 pixel block is encoded. In this case, the encoding bit may be represented by 1. As for the macroblock number 6, since it has one node, a difference value between 0 and a transform type value 0 of the second 16×16 pixel block in a macroblock is encoded. In this case, the encoding bit may be represented by 1. As for the macroblock number 7, a node is not generated with respect to the first and third 16×16 pixel blocks in the macroblock. As illustrated in FIG. 17, since the lowermost node value is {1, 0}, an encoding bit 1 indicating a difference value between 0 and the uppermost node value 0 is encoded and an encoding bit 01 indicating a difference value between the uppermost node value and the transform type value 1 of the second 16×16 pixel block is encoded. In addition, as for a transform type value of the fourth 16×16 pixel block, since it has a CBP16 flag of 1 and uses a 4×4 transform, the transform type value may not be encoded. As for the macroblock number 8, since it has one node, an encoding bit 1 indicating a difference value between 0 and a transform type value 0 of the first 16×16 pixel block in the macroblock is encoded.

Figure 18:
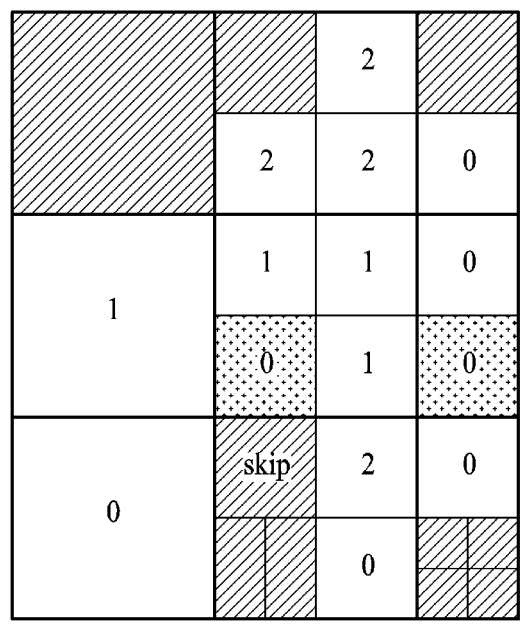
FIG. 18 is a diagram of another example of a lowermost node value for a transform type value to be encoded.

When Table 2 is applied to a transform type selected for each block of FIG. 12, the lowermost node value may be represented as illustrated in FIG. 18. Also in this case, blocks that do not encode a transform type are represented distinctively.

Figure 19:
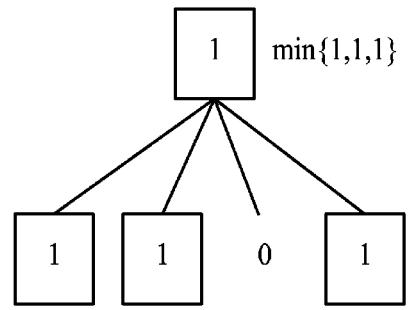
FIG. 19 is a diagram of an example of a tree structure for a macroblock number 4 in FIG. 18.
Figure 20:
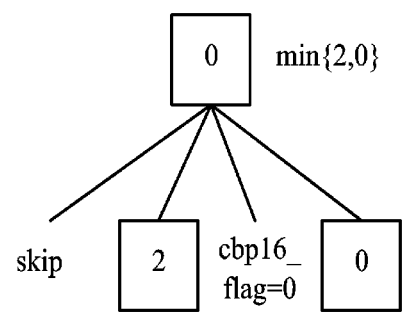
FIG. 20 is a diagram of an example of a tree structure for a macroblock number 7 in FIG. 18.

Regarding this, the macroblock number 0 has no encoding bit of a transform type. As for the macroblock number 1, since it has a lowermost node value of {2, 2, 2} as illustrated in FIG. 15, a minimum value 2 is allocated as the uppermost node value and an encoding bit 00 indicating a difference value between the uppermost node value 2 and 0 is encoded. As for the macroblock number 2, since it has one node, a difference value between 0 and a transform type value 0 of the second 16×16 pixel block in a macroblock is encoded. In this case, the encoding bit may be represented by 1. As for the macroblock number 3, since it has a node type of a 32×32 pixel block, a difference value between 0 and a transform type value 1 of a 32×32 block is encoded. In this case, the encoding bit may be represented by 01. As for the macroblock number 4, since the third 16×16 block in the macroblock is divided into subblocks smaller than an 8×8 pixel block, a fixed transform type (for example, a 4×4 transform) is used and thus a transform type may not be encoded. Therefore, a node corresponding to the third 16×16 block is not generated, a node is generated only with respect to other three 16×16 pixel blocks, and only a difference value between the uppermost node value 1 and 0 is encoded. That is, as illustrated in FIG. 19, an uppermost node value being a minimum value is selected from a lowermost node value {1, 1, 1}, and an encoding bit 01 corresponding to a difference value between an uppermost node value 1 and 0 is encoded. In this case, an encoding bit 111 indicating the lowermost node value may be encoded. As for the macroblock number 5, since the second 16×16 block in the macroblock is divided into subblocks smaller than an 8×8 pixel block, a fixed transform type (for example, a 4×4 transform) is used and a transform type may not be encoded. Thus, a node corresponding to the second 16×16 pixel block is not generated. In this case, since there is only one node, an encoding bit 1 indicating a difference value between 0 and a transform type value 0 of the first 16×16 pixel block is encoded. As for the macroblock number 6, since it has one node, an encoding bit 1 indicating a difference value between 0 and a transform type value 0 of the second 16×16 pixel block in the macroblock is encoded. As for the macroblock number 7, a node is not generated with respect to the first and third 16×16 pixel blocks in the macroblock. As illustrated in FIG. 20, since the lowermost node value is {2, 0}, an encoding bit 1 indicating a difference value between 0 and the uppermost node value 0 is encoded and an encoding bit 00 indicating a difference value between the uppermost node value and the transform type value 2 of the second 16×16 pixel block is encoded. In addition, as for a transform type value of the fourth 16×16 pixel block, since a CBP16 flag is 1 and a 4×4 transform is used, the transform type value may not be encoded. As for the macroblock number 8, since it has one node, an encoding bit 1 indicating a difference value between 0 and a transform type value 0 of the first 16×16 pixel block in the macroblock is encoded.

A method of encoding/decoding CBP information will be described below.

Figure 21:
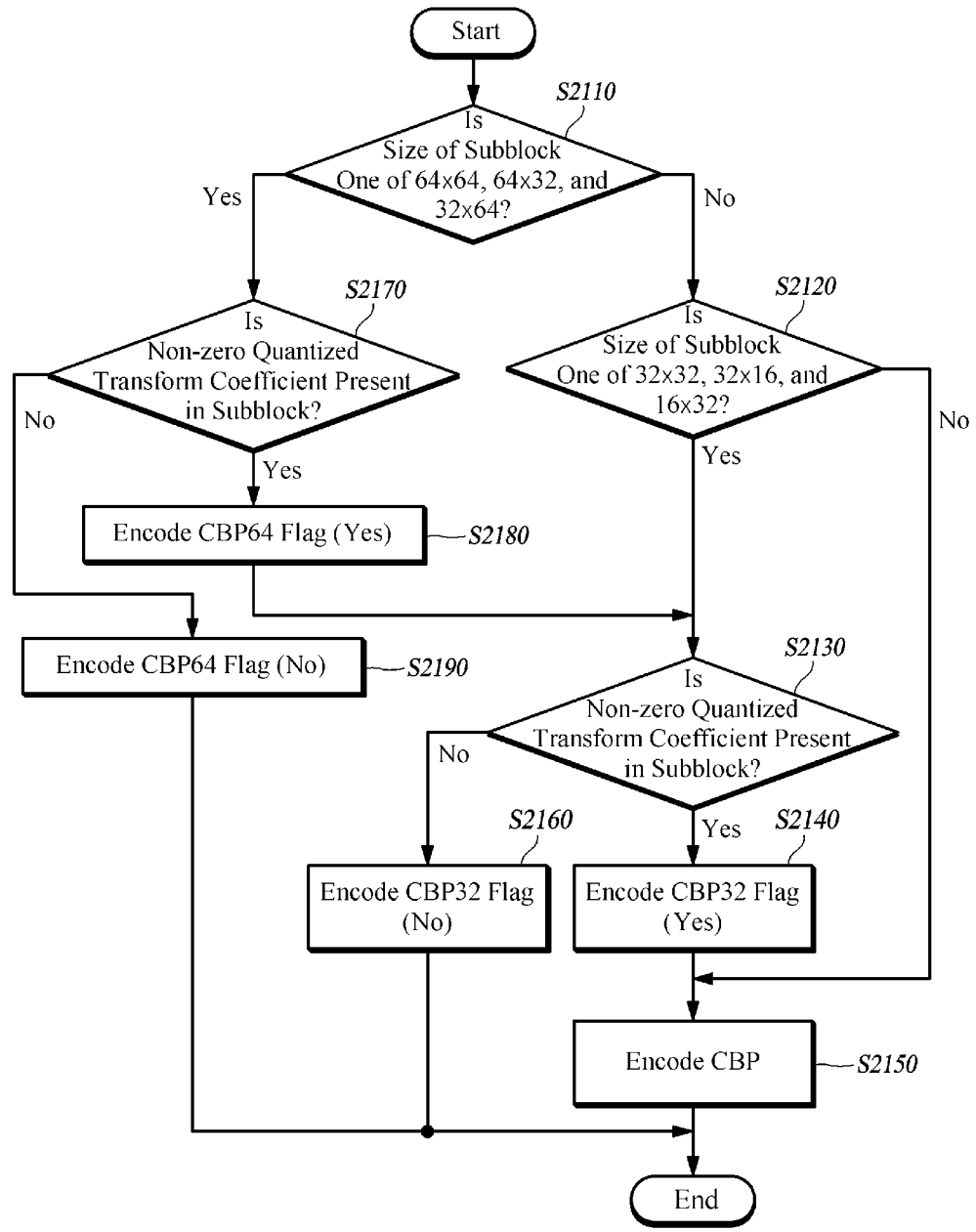
FIG. 21 is a flow diagram of an encoding and/or decoding sequence of a CBPX flag and CBP.

FIG. 21 is a flow diagram illustrating an example of a process of encoding a CBPX flag and a CBP according to an embodiment of the present disclosure. FIG. 21 illustrates an example of a process of encoding a CBPX_flag and a CBP of an intra macroblock in the event where an extended macroblock is a 64×64 pixel block. The encoding information encoder 110 determines whether the size of a subblock of a macroblock is one of 64×64, 64×32 and 32×64 (S2110). If or when the size of the subblock of the macroblock is not one of 64×64, 64×32 and 32×64, the encoding information encoder 110 determines whether the size of subblock is one of 32×32, 32×16 and 16×32 (S2120). Herein, if or when the macroblock is divided in units of a 16×16 pixel to perform an intra prediction encoding, the encoding information encoder 110 may determine in step S2110 whether the size of the subblock is a 64×64 pixel block, that is, whether an intra prediction encoding is performed in units of a macroblock. If or when the size of the subblock is not a 64×64 pixel block, the encoding information encoder 110 may determine in step S2120 whether the size of the subblock is a 32×32 pixel block. If or when it is determined in step S2120 that the size of the subblock is one of 32×32, 32×16 and 16×32, or a 32×32 pixel block, the encoding information encoder 110 determines whether a non-zero transform coefficient is present in the subblock (S2130). If or when a non-zero transform coefficient is present in the subblock, the encoding information encoder 110 encodes a CBP32 flag (which may be represented by, for example, 1 bit such as '1') indicating that a non-zero transform coefficient is present in the subblock (S2140), and encodes the CBP in the subblock in units of a 16×16 pixel block (S2150). If or when a non-zero transform coefficient is not present in the subblock, the encoding information encoder 110 encodes a CBP32 flag (which may be represented by, for example, 1 bit such as '0') indicating that a non-zero transform coefficient is not present in the subblock (S2160).

Herein, a CBP64 flag indicates whether a non-zero encoding coefficient is present in a 64×64 pixel block. Likewise, a CBP32 flag indicates whether a non-zero encoding coefficient is present in a 32×32 pixel block. If or when a residual block of a luminance component does not have a non-zero transform coefficient, since a transform type need not be transmitted, such a CBPX flag (X: 32, 64, or the like) is used to indicate whether luminance components have a non-zero transform coefficient. The CBP is encoded in units of a 16×16 pixel block. In this case, 1 bit is used per 8×8 pixel block to indicate whether a non-zero transform coefficient is present per 8×8 pixel block in a 16×16 pixel block. With respect to a chrominance component, 1 bit is used to indicate whether a non-zero transform coefficient is present in two 2×2 chrominance component DC blocks, and 1 bit is used to indicate whether a non-zero transform coefficient is present in two 8×8 chrominance component AC blocks.

On the other hand, if or when it is determined in step S2120 that the size of the subblock is not one of 32×32, 32×16 and 16×32, or a 32×32 pixel block, the encoding information encoder 110 proceeds to step S2150 and encodes the CBP. Herein, if or when the size of the subblock is not one of 32×32, 32×16 and 16×32, or a 16×32 pixel block, the encoding information encoder 110 may determine whether the size of the subblock is a 16×16, 16×8 or 8×16 pixel block. If or when the size of the subblock is a 16×16, 16×8 or 8×16 pixel block, and if or when a non-zero encoding coefficient is present in the relevant subblock, the encoding information encoder 110 may encode the CBP16 flag (which may be represented by, for example, 1 bit such as '1'). If or when not, the encoding information encoder 110 may encode the CBP in units of a 16×16 pixel block without using the CBP flag.

In addition, if or when it is determined in step S2110 that the size of the subblock is one of 64×64, 64×32 and 32×64, or a 64×64 pixel block, the encoding information encoder 110 determines whether a non-zero transform coefficient is present in the subblock (S2170). If or when a non-zero transform coefficient is present in the subblock, the encoding information encoder 110 encodes the CBP64 flag (which may be represented by, for example, 1 bit such as '1') indicating that a non-zero transform coefficient is present in the subblock (S2180); and if or when a non-zero transform coefficient is not present in the subblock, the encoding information encoder 110 encodes the CBP64 flag (which may be represented by, for example, 1 bit such as '0') indicating that a non-zero transform coefficient is not present in the subblock (S2190). Herein, the CBP64 flag indicates whether a non-zero quantized transform coefficient is present in a 64×64 pixel block.

If or when the CBP flag is encoded, and if or when the CBP flag is not 0, a transform type is encoded. Exceptionally, if or when a 16×16 pixel block is divided into four 8×8 pixel blocks, and if or when an encoded CBP is not 0, a transform type applied in units of a 16×16 pixel block is encoded.

After the transform type is encoded, the CBP is encoded according to the transform type. If or when a 16×16 transform is used, only two CBP bits of a chrominance component are encoded; and if or when an 8×16 transform or a 16×8 transform is used, two CBP bits indicating whether two 8×16 or 16×8 pixel blocks in the 16×16 pixel block have a non-zero transform coefficient are encoded. However, exceptionally, if or when a CBP bit of the first partition block among two partition blocks is 0, a CBP bit of the second partition block may not be encoded.

FIG. 22 is a diagram illustrating an example of a selected block type and a selected block mode in the encoding information encoder 110. A CBP is a 1-bit flag indicating whether a non-zero transform coefficient is present in a block. Herein, the unit of a block encoding/decoding a CBP bit varies according to the type of a selected transform. In FIG. 22, blocks having no transform coefficient to be encoded (for example, a block being a skip mode, and a block having a CBPX flag of 0) are represented by slant lines, and blocks having no need to encode a CBP (for example, a block using a 16×16 transform) are represented by cross stripes.

Regarding a method of generating a lowermost node, if or when there is data indicating that there is no transform coefficient to be encoded in a current block among the already transmitted node values and flags, a node is not generated with respect to a block having no encoding transform coefficient. For example, if or when data is not encoded/decoded by the method illustrated in FIG. 21, a node is not generated with respect to a skip block and a node is not generated with respect to an XxX (X: the number of pixels indicating a block size) block having a CBPX flag of 0. In addition, in the case of a 16×16 transform, since it can be known from a CBP16 flag, a node for a CBP is not generated.

In addition, a CBP is encoded with respect to a block having a non-zero transform coefficient. According to a transform type, as for the number of nodes, if or when a 4×4 transform or an 8×8 transform is performed with respect to a luminance component, whether a non-zero transform coefficient is present in an 8×8 block is represented by 0 or 1 (that is, a node is generated per an 8×8 pixel block). If or when an 8×16 transform or a 16×8 transform is performed with respect to a luminance component, whether a non-zero transform coefficient is present in a 16×8 or 8×16 block is represented by 0 or 1 (that is, a node is generated per a 16×8 or 8×16 block). As for a chrominance component, a node is generated with respect to an AC component and a DC component in units of an 8×8 block (that is, 1 bit is transmitted in an AC component and 1 bit is transmitted in a DC component).

In addition, a minimum value of lower nodes is used as an upper node value for generation of an upper node, and a node representing a 16×16 region may be defined as the uppermost node (or the size of the uppermost node may be designated differently).

In addition, if or when the upper node value is 1, the value of the lower nodes may not be encoded/decoded; and if or when the upper node value is 0, the value of the lower nodes may be encoded.

Figure 23:
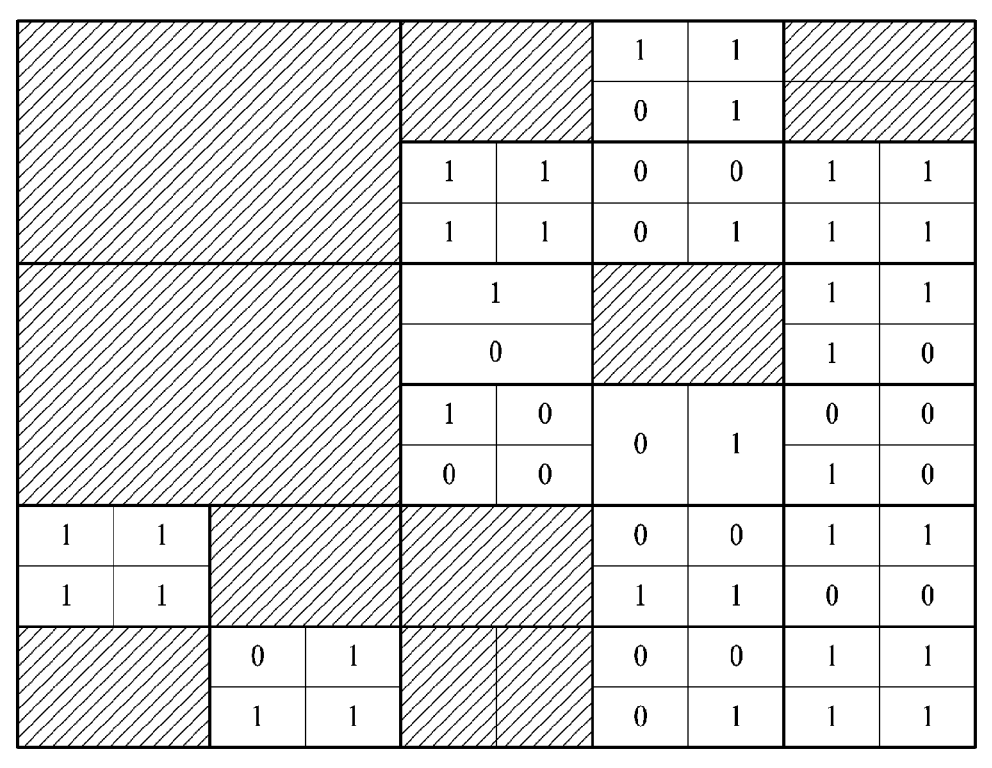
Figure 24:
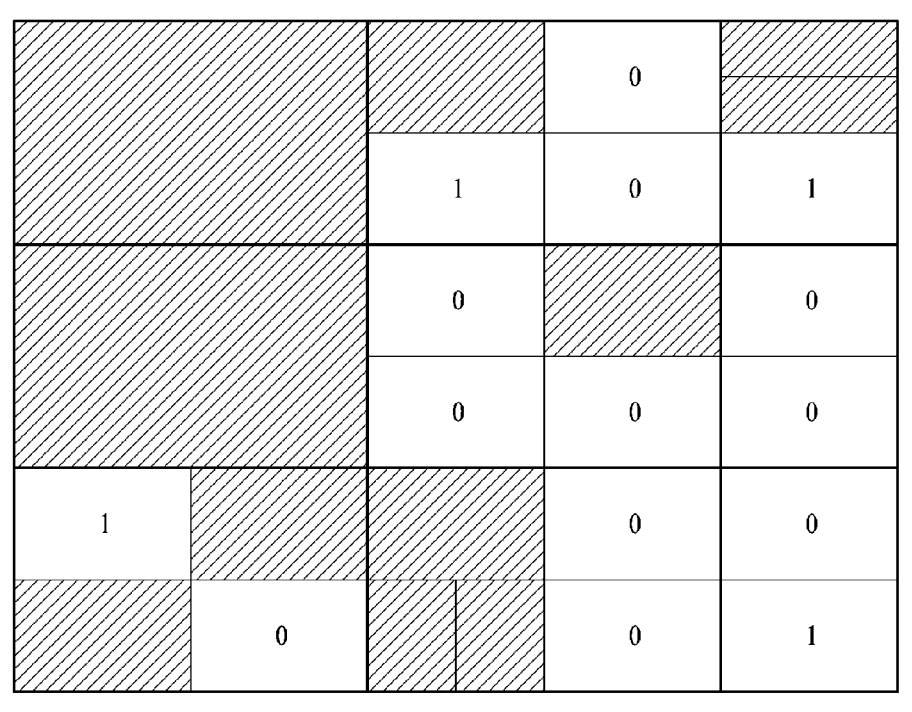

If or when an encoding mode and a transform type are selected as illustrated in FIG. 22, the unit of transmission of a CBP may be represented as illustrated in FIG. 23. In FIG. 23, if or when a block corresponding to a 16×16 region is used as the uppermost block, the uppermost node value may be allocated as illustrated in FIG. 24.

Although it has been described above that a CBP is allocated according to whether a transform coefficient is present in a block, the CBP encoding method is not limited thereto but may vary such as to use a CBP pattern.

FIG. 25 is a diagram illustrating delta quantization parameter encoding/decoding. In an exemplary embodiment of the present disclosure, only a delta quantization parameter of a macroblock or a 16×16 pixel block having a non-zero transform coefficient to be encoded may be transmitted. For example, a delta quantization parameter of an intra 16×16 pixel block or an inter 16×16 pixel block having a non-zero CBP is transmitted.

As one method of encoding a delta quantization parameter, each delta quantization parameter may be encoded by transforming it into an arranged code number and tree-coding the code number. For example, if or when a delta quantization parameter of each 16×16 pixel block is the same as illustrated in FIG. 25 and a code number arranged corresponding to a delta quantization parameter is the same as Table 3, each delta quantization parameter of FIG. 25 may be transformed into an arranged code number of Table 3.

TABLE 3

| Delta_qp Value | Code Num | Encoding Bits |
| --- | --- | --- |
| 0 | 0 | 0 |
| 1 | 1 | 10 |
| 1 | 2 | 110 |
| 2 | 3 | 1110 |
| −2 | 4 | 11110 |
| 3 | 5 | 111110 |
| −3 | 6 | 1111110 |
| . . . | . . . | . . . |

Figure 27:
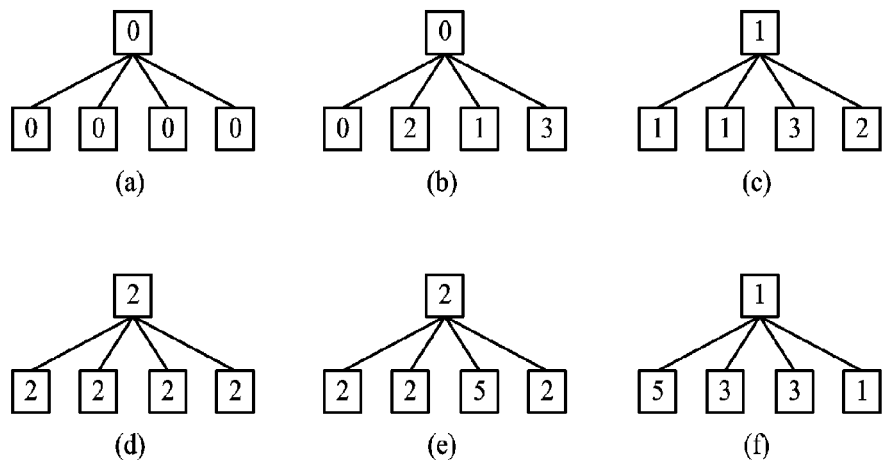
FIG. 27 is a diagram of an example of tree structure generation in FIG. 26.

Specifically, a delta quantization parameter 0 may be transformed into a code number 0, a delta quantization parameter 1 may be transformed into a code number 1, a delta quantization parameter −1 may be transformed into a code number 2, a delta quantization parameter 2 may be transformed into a code number 3, a delta quantization parameter −2 may be transformed into a code number 4, a delta quantization parameter 3 may be transformed into a code number 5, and a delta quantization parameter −3 may be transformed into a code number 6. Likewise, other delta quantization parameters may also be transformed into an arranged code number. When the delta quantization parameters of FIG. 25 are transmitted into code numbers as above, it may be represented as illustrated in FIG. 26. In this manner, a tree may be generated based on a node value of each 16×16 pixel block transformed into a code number. As a first example, when a minimum value is selected from the node values of a 16×16 pixel block transformed into a code number and allocated as an upper node value as illustrated in FIG. 26, it may be represented as illustrated in FIG. 27.

In FIG. 27A, a difference value between 0 and a node value 0 of an upper node M0 may be encoded by an encoding bit 1, and a difference value 0 between a node value 0 of lower nodes M1(0,0), M1(0,1), M1(1,0) and M1(1,1) and a node value 0 of an upper node M0 may also be encoded by an encoding bit 1.

In FIG. 27B, a difference value between 0 and a node value 0 of an upper node M0 may be encoded by an encoding bit 1, a difference value 0 between a node value 0 of a lower node M1(0,0) and a node value 0 of an upper node M0 may be encoded by an encoding bit 1, a difference value 2 between a node value 2 of a lower node M1(0,1) and a node value 0 of an upper node M0 may be encoded by an encoding bit 001, a difference value 1 between a node value 1 of a lower node M1(1,0) and a node value 0 of an upper node M0 may be encoded by an encoding bit 01, and a difference value 3 between a node value 3 of a lower node M1(1,1) and a node value 0 of an upper node M0 may be encoded by an encoding bit 0001.

In FIG. 27C, a difference value 1 between 0 and a node value 1 of an upper node M0 may be encoded by an encoding bit 01, a difference value 0 between a node value 1 of lower nodes M1(0,0) and M1(0,1) and a node value 1 of an upper node M0 may be encoded by an encoding bit 1, a difference value 2 between a node value 3 of a lower node M1(1,0) and a node value 1 of an upper node M0 may be encoded by an encoding bit 001, and a difference value 1 between a node value 2 of a lower node M1(1,1) and a node value 1 of an upper node M0 may be encoded by an encoding bit 01.

In FIG. 27D, a difference value 2 between 0 and a node value 2 of an upper node M0 may be encoded by an encoding bit 001, and a difference value 0 between a node value 2 of lower nodes M1(0,0), M1(0,1), M1(1,0) and M1(1,1) and a node value 2 of an upper node M0 may be encoded by an encoding bit 1.

In FIG. 27E, a difference value 2 between 0 and a node value 2 of an upper node M0 may be encoded by an encoding bit 001, a difference value 0 between a node value 2 of lower nodes M1(0,0), M1(0, 1) and M1(1,0) and a node value 2 of an upper node M0 may be encoded by an encoding bit 1, and a difference value 3 between a node value 5 of a lower node M1(1,1) and a node value 2 of an upper node M0 may be encoded by an encoding bit 0001.

In FIG. 27F, a difference value 1 between 0 and a node value 1 of an upper node M0 may be encoded by an encoding bit 01, a difference value 4 between a node value 5 of a lower node M1(0,0) and a node value 1 of an upper node M0 may be encoded by an encoding bit 00001, a difference value 2 between a node value 3 of lower nodes M1(1,0) and M1(1,0) and a node value 1 of an upper node M0 may be encoded by an encoding bit 001, and a difference value 0 between a node value 1 of a lower node M1(1,1) and a node value 1 of an upper node M0 may be encoded by an encoding bit 1.

Figure 28:
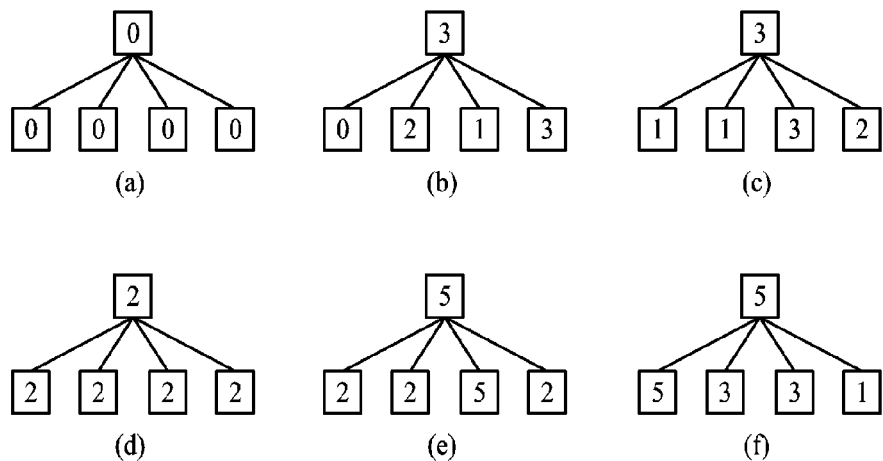
FIG. 28 is a diagram of another example of tree structure generation in FIG. 26.

A method of allocating a node value of an upper node from lower nodes is not limited to the above method, and a maximum value may be selected among the node values of lower nodes and allocated as a node value of an upper node. As an example of the second method, when a minimum value is selected from the node values of a 16×16 pixel block transformed into a code number and allocated as an upper node value as illustrated in FIG. 26, it may be represented as illustrated in FIG. 28.

In FIG. 28A, a difference value between 0 and a node value 0 of an upper node M0 may be encoded by an encoding bit 1, and an encoding bit may be skipped with respect to a difference value between a node value 0 of lower nodes M1(0,0), M1(0,1), M1(1,0) and M1(1,1) and a node value 0 of an upper node M0.

In FIG. 28B, a difference value 3 between 0 and a node value 3 of an upper node M0 may be encoded by an encoding bit 0001, a difference value 1 between a node value 0 of a lower node M1(0,0) and a node value 3 of an upper node M0 may be encoded by an encoding bit 0001, a difference value 1 between a node value 2 of a lower node M1(0,1) and a node value 3 of an upper node M0 may be encoded by an encoding bit 01, a difference value 2 between a node value 1 of a lower node M1(1,0) and a node value 3 of an upper node M0 may be encoded by an encoding bit 001, and a difference value 0 between a node value 3 of a lower node M1(1,1) and a node value 3 of an upper node M0 may be encoded by an encoding bit 1.

In FIG. 28C, a difference value between 0 and a node value 3 of an upper node M0 may be encoded by an encoding bit 0001, a difference value 2 between a node value 1 of lower nodes M1(0,0) and M1(0,1) and a node value 3 of an upper node M0 may be encoded by an encoding bit 001, a difference value between a node value 3 of a lower node M1(1,0) and a node value 3 of an upper node M0 may be encoded by an encoding bit 1, and a difference value 1 between a node value 2 of a lower node M1(1,1) and a node value 3 of an upper node M0 may be encoded by an encoding bit 01.

In FIG. 28D, a difference value between 0 and a node value 2 of an upper node M0 may be encoded by an encoding bit 001, and a difference value 0 between a node value 2 of lower nodes M1(0,0), M1(0,1), M1(1,0) and M1(1,1) and a node value 2 of an upper node M0 may be encoded by an encoding bit 1.

In FIG. 28E, a difference value between 0 and a node value 5 of an upper node M0 may be encoded by an encoding bit 000001, a difference value 3 between a node value 2 of lower nodes M1(0,0), M1(0, 1) and M1(1,0) and a node value 5 of an upper node M0 may be encoded by an encoding bit 0001, and a difference value 0 between a node value 5 of a lower node M1(1,1) and a node value 5 of an upper node M0 may be encoded by an encoding bit 1.

In FIG. 28F, a difference value between 0 and a node value 5 of an upper node M0 may be encoded by an encoding bit 000001, a difference value 0 between a node value 5 of a lower node M1(0,0) and a node value 5 of an upper node M0 may be encoded by an encoding bit 00001, a difference value 2 between a node value 3 of lower nodes M1(1,0) and M1(1,0) and a node value 5 of an upper node M0 may be encoded by an encoding bit 001, and a difference value 4 between a node value 1 of a lower node M1(1,1) and a node value 5 of an upper node M0 may be encoded by an encoding bit 00001.

In the method of allocating the minimum value among the lower node values as the uppermost node value, a difference value from 0 is encoded for encoding the uppermost node value. However, a difference value between a certain value with high occurrence frequency and the uppermost node value may be encoded. Herein, the certain value used may be encoded and notified to the decoder. Alternatively, an arranged value may be used, and the encoder and the decoder may operate in the same way to calculate the same.

In addition, as a third method for tree generation, if or when a minimum value among lower node values is allocated as an upper node value, a maximum value may be encoded and notified to the decoder; and if or when a maximum value among lower node values is allocated as an upper node value, a minimum value may be encoded and a range thereof may be notified to the decoder. For example, as for an encoding bit of FIG. 27B corresponding to a case where a minimum value among lower node values is allocated as an upper node value, a difference value 0 between 0 and a node value 0 of an upper node M0 may be encoded by an encoding bit 1, a difference value 0 between a node value 0 of a lower node M1(0,0) and a node value 0 of an upper node M0 may be encoded by an encoding bit 1, a difference value 2 between a node value 2 of a lower node M1(0,1) and a node value 0 of an upper node M0 may be encoded by an encoding bit 001, a difference value 1 between a node value 1 of a lower node M1(1,0) and a node value 0 of an upper node M0 may be encoded by an encoding bit 01, and an encoding bit may be skipped with respect to a difference value 3 between a node value 3 of a lower node M1(1,1) and a node value 0 of an upper node M0. In addition, for example, as for an encoding bit of FIG. 28D corresponding to a case where a maximum value among lower node values is allocated as an upper node value, a difference value between 0 and a node value 2 of an upper node M0 may be encoded by an encoding bit 001, and a difference value 0 between a node value 2 of lower nodes M1(0,0), M1(0,1), M1(1,0) and M1(1,1) and a node value 2 of an upper node M0 may be encoded by an encoding bit 1.

In addition, as another method of encoding a delta quantization parameter, an absolute value of a delta quantization parameter may be encoded and then only a non-zero delta parameter may be encoded. For example, when an absolute value is taken with respect to the delta quantization parameter of FIG. 25, it may be represented as illustrated in FIG. 29 and the above-described tree generating method may also be applied in this case.

Figures 29, 30:
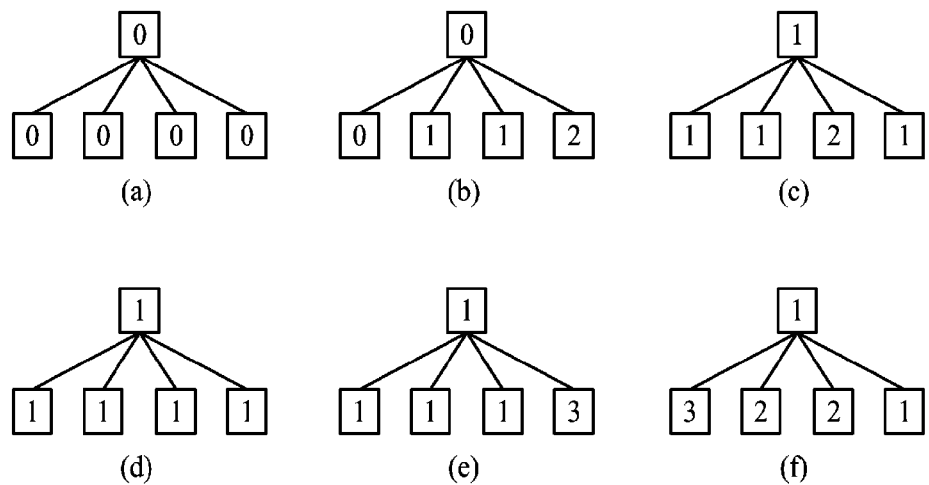
FIG. 29 is a diagram of another example of delta quantization parameter encoding.
FIG. 30 is a diagram of the event where an absolute value of a delta quantization parameter in FIG. 29 is taken.

When the first tree generating method is used and the maximum value is encoded prior to transmission, the minimum value may be selected among the lower node values and allocated as the upper node value as illustrated in FIG. 30 and the absolute value may be encoded using Table 3.

In FIG. 30A, an encoding bit of a maximum value 0 may be encoded by 0, and encoding of an encoding bit may be skipped with respect to a difference value 0 between 0 and a node value 0 of and upper node M0 and a difference value 0 between a node value 0 of lower nodes M1(0,0), M1(0,1), M1(1,0) and M1(1,1) and a node value 0 of an upper node M0.

In FIG. 30B, a maximum value 2 may be encoded by an encoding bit 001, a difference value between 0 and a node value 0 of an upper node M0 may be encoded by an encoding bit 1, a difference value 0 between a node value 0 of a lower node M1(0,0) and a node value 0 of an upper node M0 may be encoded by an encoding bit 1, a difference value 1 between a node value 1 of lower nodes M1(0,1) and M1(1,0) and a node value 0 of an upper node M0 may be encoded by an encoding bit 001, and a difference value 2 between a node value 2 of a lower node M1(1,1) and a node value 0 of an upper node M0 may be encoded by an encoding bit 001.

In FIG. 30C, a maximum value 2 may be encoded by an encoding bit 001, a difference value 1 between 0 and a node value 1 of an upper node M0 may be encoded by an encoding bit 01, a difference value 0 between a node value 1 of lower nodes M1(0,0) and M1(1,0) and a node value 1 of an upper node M0 may be encoded by an encoding bit 1, a difference value 1 between a node value 2 of a lower node M1(1,0) and a node value 1 of an upper node M0 may be encoded by an encoding bit 01, and a difference value 0 between a node value 1 of a lower node M1(1,1) and a node value 1 of an upper node M0 may be encoded by an encoding bit 1.

In FIG. 30C, a maximum value 1 may be encoded by an encoding bit 1, and encoding of an encoding bit may be skipped with respect to a difference value 1 between 0 and a node value 1 of and upper node M0 and a difference value 0 between a node value 1 of lower nodes M1(0,0), M1(0,1), M1(1,0) and M1(1,1) and a node value 1 of an upper node M0.

In FIG. 30E, a maximum value 3 may be encoded by an encoding bit 0001, a difference value 1 between 0 and a node value 1 of an upper node M0 may be encoded by an encoding bit 01, a difference value 0 between a node value 1 of lower nodes M1(0,0), M1(1,0) and M1(1,0) and a node value 1 of an upper node M0 may be encoded by an encoding bit 1, and a difference value 2 between a node value 3 of a lower node M1(1,1) and a node value 1 of an upper node M0 may be encoded by an encoding bit 001.

In FIG. 30F, a maximum value 3 may be encoded by an encoding bit 0001, a difference value 1 between 0 and a node value 1 of an upper node M0 may be encoded by an encoding bit 01, a difference value 2 between a node value 3 of a lower node M1(0,0) and a node value 1 of an upper node M0 may be encoded by an encoding bit 001, a difference value 1 between a node value 2 of lower nodes M1(1,0) and M1(1,0) and a node value 1 of an upper node M0 may be encoded by an encoding bit 01, and encoding of an encoding bit may be skipped with respect to a difference value 0 between a node value 1 of a lower node M1(1,1) and a node value 1 of an upper node M0.

Figure 31:
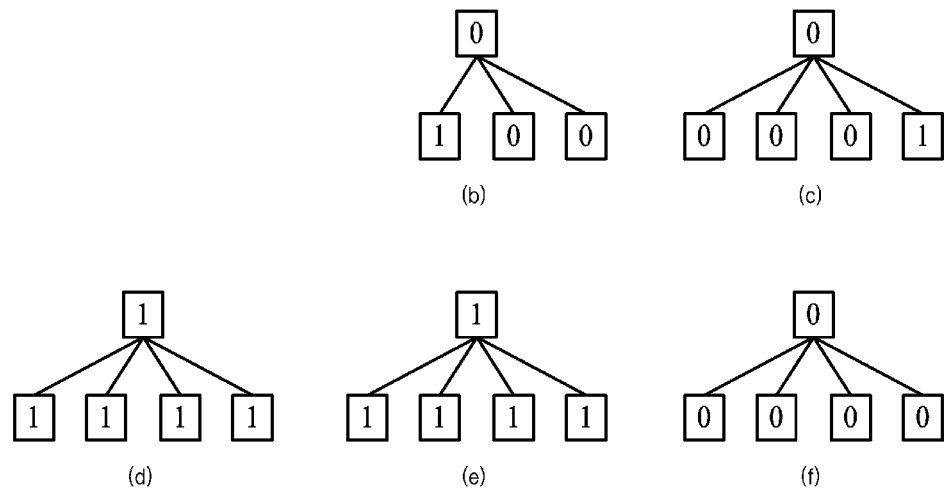
FIG. 31 is a diagram of a method of encoding a code in FIG. 29.

Next, encoding may be performed with respect to a sign. For example, if or when a sign is +, 0 may be used; and if or when a sign is −, 1 may be used. The opposite encoding bit may also be allocated. In this case, an upper node may use a minimum value of lower nodes and may use a maximum value. In FIG. 30, except the case where an absolute value of a delta quantization parameter is 0, 0 is allocated to + and 1 is allocated to − for encoding of a sign of a delta quantization parameter. When a minimum value is selected among the respective lower node values and allocated as an upper node value, it may be represented as illustrated in FIG. 31. In FIG. 30A, absolute values are all 0, there is no data to be encoded.

In FIG. 31B, a difference value 0 between 0 and an upper node value 0 may be encoded by an encoding bit 1. Since a node value of M1(0,0) is 0, encoding of an encoding bit may be skipped. A difference value 1 between a node value 1 of M1(0,1) and an upper node value 0 may be encoded by an encoding bit 0, and a difference value 0 between a node value 0 of M1(1,0) and M1(1,1) and an upper node value 0 may be encoded by an encoding bit 1.

In FIG. 31C, a difference value 0 between 0 and an upper node value 0 may be encoded by an encoding bit 1, a difference value 0 between a node value 0 of M1(0,0), M1(0,1) and M1(1,0) and an upper node value 0 may be encoded by an encoding bit 1, and a difference value 1 between a node value 1 of M1(1,1) and an upper node value 0 may be encoded by an encoding bit 0.

In FIG. 31D, a difference value 1 between 0 and an upper node value 1 may be encoded by an encoding bit 0, and encoding of an encoding bit may be skipped with respect to a difference value 0 between a node value 1 of M1(0,0), M1(0,1), M1(1,0) and M1(1,1) and an upper node value 1.

In FIG. 31E, a difference value 1 between 0 and an upper node value 1 may be encoded by an encoding bit 0, and encoding of an encoding bit may be skipped with respect to a difference value 0 between a node value 1 of M1(0,0), M1(0,1), M1(1,0) and M1(1,1) and an upper node value 1.

In FIG. 31F, a difference value 0 between 0 and an upper node value 0 may be encoded by an encoding bit 1, and a difference value 0 between a node value 0 of M1(0,0), M1(0,1), M1(0) and M1(1,1) and an upper node value 0 may be encoded by an encoding bit 1.

Figure 32:
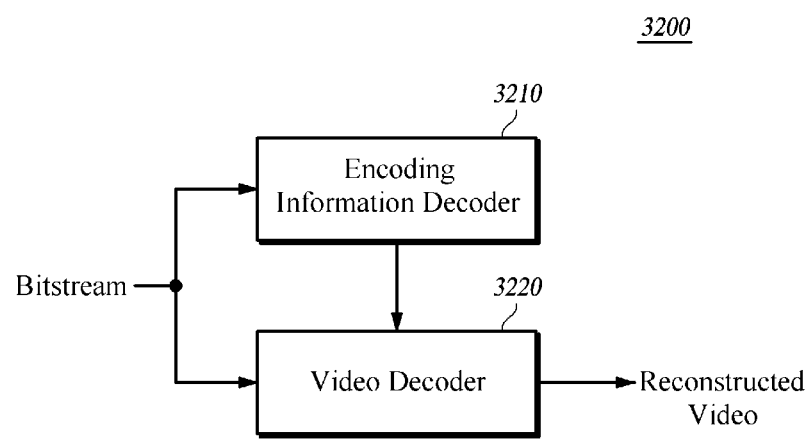
FIG. 32 is a block diagram of a schematic configuration of a video decoding apparatus according to at least one embodiment of the present disclosure.

FIG. 32 is a block diagram illustrating a schematic configuration of a video decoding apparatus according to an embodiment of the present disclosure.

A video decoding apparatus 3200 according to an embodiment of the present disclosure may include an encoding information decoder 3210 and a video decoder 3300.

The encoding information decoder 3210 decodes a bitstream to reconstruct block mode information indicating whether a block mode of a block to be decoded is a skip mode and partition mode information indicating whether the block is divided into subblocks, and decodes a bitstream according to a combination of the block mode information and the partition mode information to reconstruct skip motion information of the block or prediction encoding information including block type information and prediction information of the block.

For example, the encoding information decoder 3210 decodes a bitstream having a syntax structure as illustrated in FIG. 6. First, the encoding information decoder 3210 reconstructs block mode information and partition mode information by extracting and decoding data allocated to a block mode information field and data allocated to a partition mode information field from a bitstream. The encoding information decoder 3210 reconstructs skip motion information by extracting and decoding data allocated to a skip motion information field from a bitstream according to a combination of the reconstructed block mode information and partition mode information, as illustrated in FIG. 6A. The encoding information decoder 3210 reconstructs prediction encoding information including block type information, prediction information, CBP subblock information, transform type information, CBP information, and delta QP information by extracting and decoding data allocated to a block type information field, a prediction information field, a CBP subblock flag field, a transform type information field, a CBP field, and a delta QP field from a bitstream, as illustrated in FIG. 6B. Herein, among the prediction encoding information, the CBP subblock flag field, the transform type information field, the CBP field, and the delta QP field are not necessarily reconstructed, but may be reconstructed only when they are arranged between the video encoding apparatus 100 and the video decoding apparatus 3200.

The video decoder 3300 reconstructs the block based on the skip motion information or reconstructs the block by decoding coefficient information reconstructed by decoding the bitstream based on the prediction encoding information.

For example, when skip motion information is reconstructed by the encoding information decoder 3210, the video decoder 3300 reconstructs a block to be decoded by generating a block by motion-compensating a block to be decoded or each subblock of the block by using the reconstructed skip motion information. When prediction encoding information is reconstructed by the encoding information decoder 3210, the video decoder 3300 generates a predicted block by intra-predicting or inter-predicting a block to be decoded or each subblock of the block by using the reconstructed prediction encoding information, reconstructs coefficient information by decoding a bitstream, and reconstructs the block to be decoded by adding the predicted block and a residual block generated by the reconstructed coefficient information.

Figure 33:
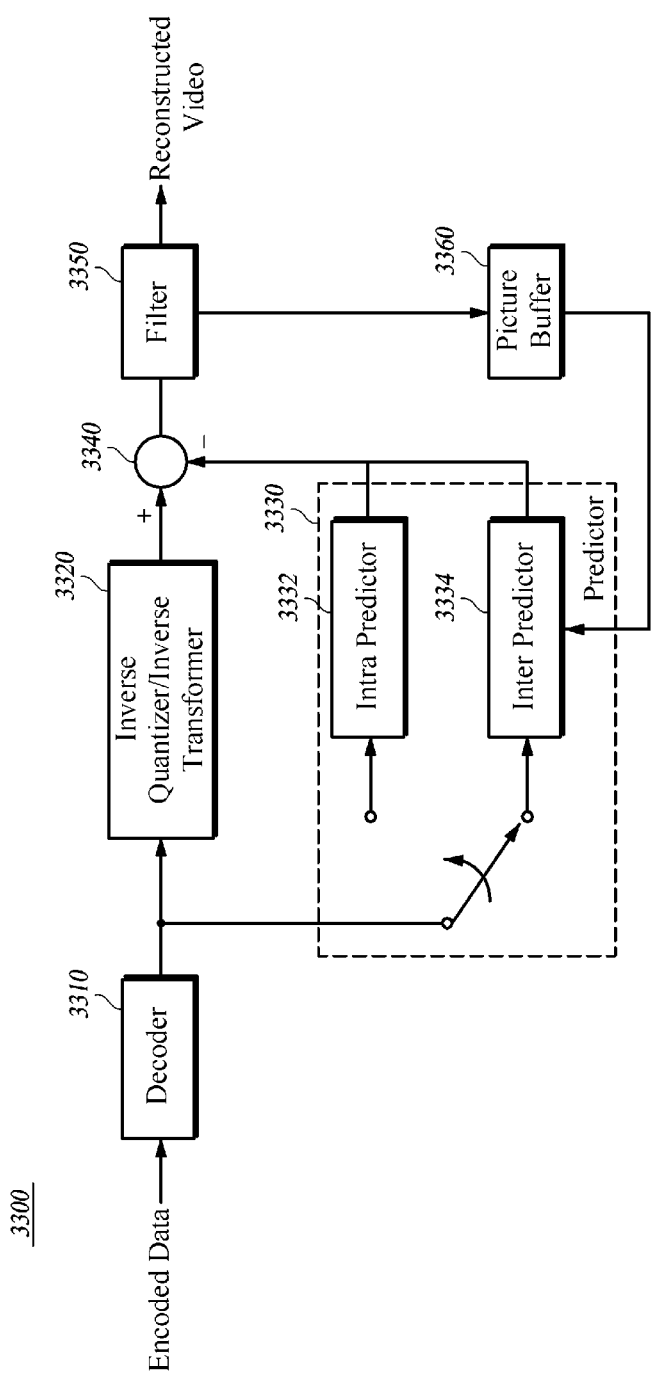
FIG. 33 is a diagram of a schematic configuration of a video decoder in FIG. 32.

FIG. 33 is a diagram illustrating a schematic configuration of the video decoder 3300. Referring to FIG. 33, the video encoder 3300 may include a decoder 3310, an inverse quantizer/inverse transformer 3320, a predictor 3330, an adder 3340, a filter 3350, and a picture buffer 3360. The predictor may include a motion compensator. Other components of the video decoder 3300, such as the decoder 3310, the inverse quantizer/inverse transformer 3320, the predictor 3330, the adder 3340, the filter 3350 comprise one or more processors and/or application-specific integrated circuits (ASICs) specified for respectively corresponding operations and functions described herein after. The video decoder 3300 further comprises input units (not shown in FIG. 33) such as one or more buttons, a touch screen, a mic and so on, and output units (not shown in FIG. 33) such as a display, an indicator and so on. The video decoder 3300 further comprises communication modem(s) to receive and/ or communication signals to thereby communicate with a video encoding apparatus (or a video encoder) through wire or wireless networks (herein, the wire or wireless networks include, for example, one or more network interfaces including, but not limited to, cellular, Wi-Fi, LAN, WAN, CDMA, WCDMA, GSM, LTE and EPC networks, and cloud computing networks). The picture buffer 3360 includes one or more non-transitory computer readable recording medium.

Figure 34:
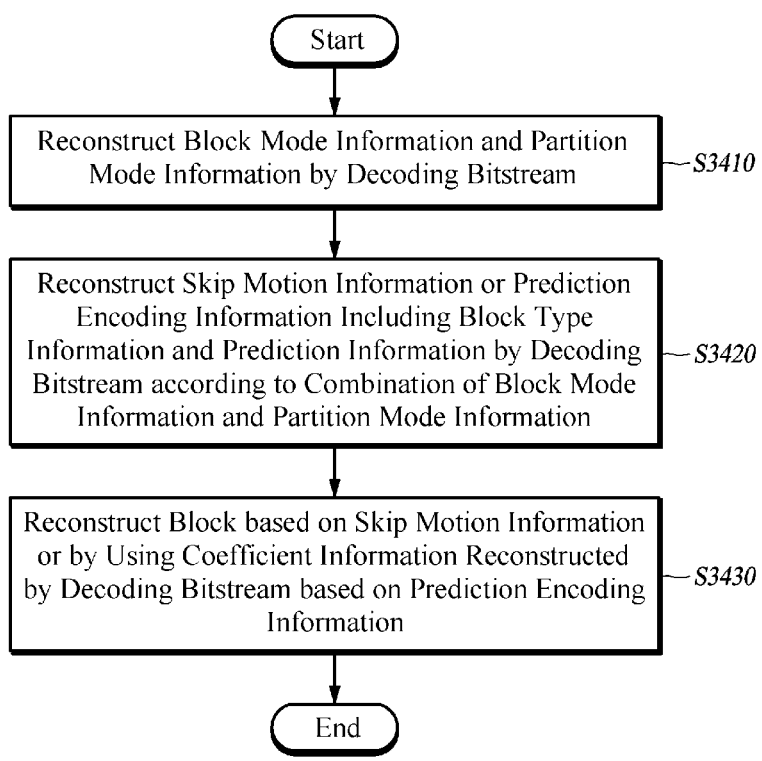
FIG. 34 is a flow diagram of a video decoding method according to at least one embodiment of the present disclosure.

FIG. 34 is a flow diagram illustrating a video decoding method according to an embodiment of the present disclosure.

In a video decoding method according to an embodiment of the present disclosure, the video decoding apparatus 3200 decodes a bitstream to reconstruct block mode information indicating whether a block to be decoded is a skip mode and a partition mode information indicating whether the block is divided into subblocks (S3410). Specifically, the video decoding apparatus 3200 reconstructs block mode information and partition mode information by extracting and decoding data generated by encoding block mode information and data generated by encoding partition mode information from a bitstream for a block to be decoded.

The video decoding apparatus 3200 reconstructs skip motion information of the block or prediction encoding information including block type information of the block and prediction information of the block by decoding a bitstream according to a combination of block mode information and partition mode information (S3420). The video decoding apparatus 3200 reconstructs the block based on the skip motion information or by decoding coefficient information reconstructed by decoding the bitstream based on the prediction encoding information (S3430). Specifically, the video decoding apparatus 3200 encodes the block in different ways according to the respective cases corresponding to a combination of whether the block mode information indicates that a block mode of a block to be encoded is a skip mode and whether the partition mode information indicates that the block is divided into subblocks.

Hereinafter, an example of the process of performing step S3420 and step S3430 by the video decoding apparatus 3200 will be described assuming that a block to be encoded is a 64×64 pixel macroblock and the block is divided into 16×16 pixel subblocks.

In step S3420, if or when the block mode information indicates that a block mode of the block is a skip mode and the partition mode information indicates that the block is not divided into subblocks, the video decoding apparatus 3200 may reconstruct skip motion information for the block by decoding a bitstream. Specifically, the video decoding apparatus 3200 reconstructs skip motion information by extracting and decoding data generated by encoding skip motion information from a bitstream, wherein the skip motion information is reconstructed as one piece of motion information for a block to be decoded. In this case, in step S3430, the video decoding apparatus 3200 reconstructs a block to be decoded by generating a block by motion-compensating a block to be decoded by using the reconstructed skip motion information.

In step S3420, if or when the block mode information indicates that a block mode of the block is a skip mode and the partition mode information indicates that the block is divided into subblocks, the video decoding apparatus 3200 may reconstruct skip motion information for each subblock of the block by decoding a bitstream. Specifically, the video decoding apparatus 3200 reconstructs skip motion information by extracting and decoding data generated by encoding skip motion information from a bitstream, wherein the skip motion information is reconstructed as a plurality of motion information for the respective subblocks of a block to be decoded. In this case, in step S3430, the video decoding apparatus 3200 reconstructs each subblock of a block to be decoded by generating a subblock by motion-compensating each subblock of a block to be decoded by using the reconstructed skip motion information of each subblock, and reconstructs the block to be decoded through the reconstructed subblocks.

In step S3420, if or when the block mode information indicates that a block mode of the block is not a skip mode and the partition mode information indicates that the block is not divided into subblocks, the video decoding apparatus 3200 may reconstruct prediction encoding information for the block by decoding a bitstream. Specifically, the video decoding apparatus 3200 reconstructs prediction encoding information by extracting and decoding data generated by encoding prediction encoding information from a bitstream, wherein the prediction encoding information is reconstructed as one piece of prediction encoding information for a block to be decoded. In this case, in step S3430, the video decoding apparatus 3200 reconstructs coefficient information by extracting and decoding data generated by encoding coefficient information from a bitstream based on the prediction information and block type information of the prediction encoding information, reconstructs a residual block by inverse-quantizing and inverse-transforming the reconstructed coefficient information, generates a predicted block by predicting a block to be decoded based on the block type information and the prediction information, and reconstructs the block to be decoded by adding the residual block and the predicted block.

In step S3420, if or when the block mode information indicates that a block mode of the block is not a skip mode and the partition mode information indicates that the block is divided into subblocks, the video decoding apparatus 3200 may reconstruct prediction encoding information for a subblock of the block by decoding a bitstream. Specifically, the video decoding apparatus 3200 reconstructs prediction encoding information by extracting and decoding data generated by encoding prediction encoding information from a bitstream, wherein the prediction encoding information is reconstructed as a plurality of prediction encoding information for each subblock of a block to be decoded. In this case, in step S3430, the video decoding apparatus 3200 reconstructs coefficient information for each subblock by extracting and decoding data generated by encoding coefficient information from a bitstream based on the prediction information and block type information of the prediction encoding information, reconstructs a residual subblock by inverse-quantizing and inverse-transforming the reconstructed coefficient information for each subblock, generates a predicted subblock by predicting each subblock based on the block type information and the prediction information, and reconstructs each subblock by adding the residual subblock and the predicted subblock, thereby reconstructing the block to be decoded.

Herein, the block type information may be a block type number that is allocated to a plurality of available block types based on a partition type of a subblock of the block and whether the block is an inter macroblock or an intra macroblock. The prediction encoding information may further include one or more of transform type information of the subblock, CBP information of the subblock, and delta quantization parameter information of the subblock. The block type information may include a block type flag indicating whether the block is an inter macroblock or an intra macroblock and partition type information indicating a partition type of the subblock.

In addition, if or when the reconstructed block mode information indicates that a block mode of a block to be decoded is not a skip mode and the reconstructed partition mode information indicates that the block is divided into subblocks, the block type information may further include a skip subblock flag indicating whether a block mode of the subblock is skip mode, in addition to a block type flag indicating whether the block is an inter macroblock or an intra macroblock and partition type information indicating a partition type of the subblock of the block. Specifically, if or when a block mode of a block to be decoded is not a skip mode and the block is divided into subblocks, the video decoding apparatus 3200 may not necessarily extract and decode data generated by encoding prediction encoding information and data generated by encoding coefficient information with respect to each subblock from a bitstream. If or when it is determined that a skip mode of a certain subblock is a skip mode by decoding only a skip subblock flag from a bitstream, the video decoding apparatus 3200 may skip decoding the relevant subblock.

In step S3420, the video decoding apparatus 3200 may use a tree structure to reconstruct the partition type information when decoding a bitstream to reconstruct the block type information.

Hereinafter, with reference to FIGS. 7 and 8, a description will be given of a process of reconstructing partition type information by using a tree structure when decoding a bitstream to reconstruct block type information according to an embodiment of the present disclosure.

When an uppermost node value is encoded by the video encoding apparatus 100, a partition type number is set as a partition type value, a great partition type number is set in descending order of the occurrence frequency of partition type, and a difference value from the greatest partition type number is encoded using a binary bit of 0 and 1. In this case, the video decoding apparatus 3200 extracts data generated by encoding the partition type information from a bitstream, reconstructs the difference value by decoding a binary bit of 0 and 1 of the extracted data, and reconstructs the uppermost node value by subtracting the reconstructed difference value from the greatest partition type number. Herein, in order to reconstruct the difference value, the video decoding apparatus 3200 reads in and decodes one bit of the data generated by encoding the partition type information, reconstructs the binary bit, and reads in a next bit if or when the reconstructed binary bit is 0. In this way, the video decoding apparatus 3200 continues to reconstruct the binary bit 0 until the binary bit 1 is reconstructed, and does not reads in a binary bit any more if or when the reconstructed bit is 1, wherein the difference value is a coefficient of the reconstructed binary bit 0. However, if or when the number of read-in bits corresponds to the difference value between the maximum value and the minimum value of the partition type number, the next bit is not read in, wherein the difference value is a coefficient of the reconstructed binary bit 0 (in this case, the difference value is a difference value between the maximum value and the minimum value of the partition type number).

On the other hand, when an uppermost node value is encoded by the video encoding apparatus 100, a partition type number is set as a partition type value, a great partition type number is set in ascending order of the occurrence frequency of partition type, and a difference value from the smallest partition type number is encoded using a binary bit of 0 and 1. In this case, the video decoding apparatus 3200 extracts data generated by encoding the partition type information from a bitstream, reconstructs the difference value by decoding a binary bit of 0 and 1 of the extracted data, and reconstructs the uppermost node value by subtracting the reconstructed difference value from the smallest partition type number. Herein, a method of reconstructing the difference value by the video decoding apparatus 3200 is the same as described above.

In addition, when an uppermost node value is encoded by the video encoding apparatus 100, a difference value 0 is encoded by using a binary bit of 0 and 1 as described above. In this case, the video decoding apparatus 3200 extracts data generated by encoding the partition type information from a bitstream, reconstructs the difference value by decoding a binary bit of 0 and 1 of the extracted data, and reconstructs the reconstructed difference value as the uppermost node value. Herein, a method of reconstructing the difference value by the video decoding apparatus 3200 is the same as described above.

Thereafter, the video decoding apparatus 3200 decodes a node value of lower nodes of the uppermost node. The video encoding apparatus 100 encodes a node value by encoding binary bits 0 as many as the difference value between a node value of a node to be encoded and a node value of an upper node. In this case, when decoding node values of the respective nodes, the video decoding apparatus 3200 reads in and decodes the next one bit of the bits that are extracted from a bitstream and read in to reconstruct an uppermost node value, and reads in and decodes the next bit if or when the reconstruct binary bit is 0. If or when the reconstructed node value of the upper node is the maximum possible value of the partition type number, the binary bit is not reconstructed and the maximum possible value of the partition type number is reconstructed as the node value to be decoded. If or when the reconstructed binary bit is 1, no more bit is read in, the number of binary bits 0 is reconstructed as the difference value, the node value of the node to be decoded is reconstructed by adding the node value of the node to the reconstructed difference value. If or when the video encoding apparatus 100 encodes a node value by encoding binary bits 1 as many as the difference value between a node value of a node to be encoded and a node value of an upper node, the binary bit is reconstructed by decoding a bit one by one until the reconstructed binary bit is 0 in the above method.

However, when a node value to be decoded is reconstructed, if or when the sum of a difference value corresponding to the number of binary bits 0 reconstructed up to now and a node value of an upper node of the relevant node is the maximum possible value of the partition type number, no more bit is read in and the maximum possible value of the partition type number is reconstructed as the relevant node value. In addition, when a node value of the last node among the nodes having the same upper node is reconstructed, if or when the node value of the nodes except the last node is greater than the node value of the upper node, no more bit is read in and the node value of the upper node is reconstructed as the node value of the last node.

As another embodiment of decoding the partition type information by using a tree structure, if or when the partition type values of subblocks illustrated in FIG. 7A are grouped and each partition type number is set in descending order of occurrence frequency in determining a partition type value of a grouped region of FIG. 7B, the node value of a current node is reconstructed by subtracting the node value from the node value of the upper node.

As described above, according to the embodiment of the present disclosure, since a relevant block can be efficiently encoded/decoded according to a combination of a partition mode and a block mode of the block of a video to be encoded, video compression efficiency can be improved.

A method of encoding a relevant block according to a combination of partition mode information and block mode information of the block to be encoded, and a syntax structure of a bitstream generated by encoding have been described above through an embodiment of the present disclosure. Hereinafter, a method of encoding a video by selectively using an encoding scheme for a relevant block according to skip type information of the block to be encoded will be described through another embodiment of the present disclosure.

Figure 35:
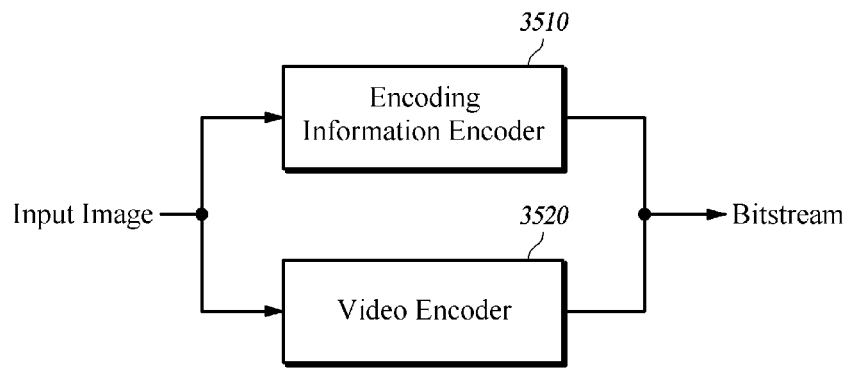
FIG. 35 is a block diagram of a schematic configuration of a video encoding apparatus according to at least one embodiment of the present disclosure.

FIG. 35 is a block diagram illustrating a schematic configuration of a video encoding apparatus according to another embodiment of the present disclosure.

A video encoding apparatus 3500 according to another embodiment of the present disclosure may include an encoding information encoder 3510 and a video encoder 3520.

The encoding information encoder 3510 encodes skip type information indicating a skip type of a block of a video to be encoded, and encodes skip motion information of the block according to the skip type information. Specifically, if or when a block mode of a block to be encoded is a skip mode, the encoding information encoder 3510 encodes skip type information indicating a skip type of the block, and encodes skip motion information of the block based on the skip type information. For example, if or when a skip type of the block indicates that skip motion information of the block is encoded, the encoding information encoder 3510 encodes skip motion information of the block.

The video encoder 3520 encodes coefficient information of the block according to the skip type information of the block. Specifically, if or when a block mode of a block to be encoded is a skip mode, the video encoder 3520 encodes coefficient information of the block based on the skip type information. For example, if or when a skip type of the block indicates that coefficient information of the block is encoded, the encoding information encoder 3520 encodes skip motion information of the block. Like the video encoder 200 according to an embodiment of the present disclosure described with reference to FIG. 1, the video encoder 3520 may include a predictor, a subtracter, a transformer/quantizer, an encoder, an inverse quantizer/inverse transformer, an adder, a filter, and picture buffer.

If or when the skip type information of the block indicates that encoding of the block is skipped, only the skip type information is encoded without encoding both the skip motion information and the coefficient information of the relevant block.

Figure 36:
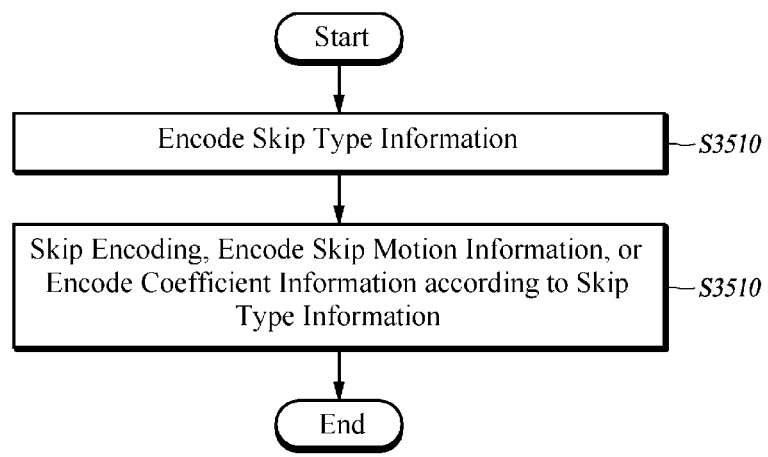
FIG. 36 is a flow diagram of a video encoding method according to at least one embodiment of the present disclosure.

FIG. 36 is a flow diagram illustrating a video encoding method according to another embodiment of the present disclosure.

In a video encoding method according to another embodiment of the present disclosure, the video encoding apparatus 3500 encodes skip type information indicating whether a skip type of a block of a video to be encoded (S3610). Herein, the skip type indicates how to encode a skip mode block when a block mode of a block is a skip mode. Specifically, if or when a block mode of a block to be encoded is a skip mode, the video encoding apparatus 3500 encodes skip type information indicating whether to encode only coefficient information of the block, to encode only motion information of the block, or to skip encoding the block, when encoding a skip mode of the block.

The skip type information may be embodied by a 1-bit skip type flag, and the skip type may be represented through the 1-bit skip type flag as the following three cases. For example, if or when the skip type flag is 0, it indicates that the skip mode skips encoding the block; and if or when the skip type flag is 1, it indicates that the skip mode encodes a skip motion vector without encoding coefficient information of the block. As another example, if or when the skip type flag is 0, it indicates that the skip mode skips encoding the block; and if or when the skip type flag is 1, it indicates that the skip mode encodes coefficient information of the block without encoding a skip motion vector. As another example, if or when the skip type flag is 0, it indicates that the skip mode encodes a skip motion vector without encoding coefficient information of the block; and if or when the skip type flag is 1, it indicates that the skip mode encodes coefficient information of the block without encoding a skip motion vector.

According to the skip type information, the video encoding apparatus 3500 skips encoding the block, encodes skip motion information of the block, or encodes coefficient information of the block (S3620).

Herein, the skip type information may indicate that encoding of the block is skipped or may indicate that skip motion information of the block is encoded. Alternatively, the skip type information may indicate that encoding of the block is skipped or may indicate that coefficient information of the block is encoded. Alternatively, the skip type information may indicate that skip motion information of the block is encoded or may indicate that coefficient information of the block is encoded.

Thus, in step 3620, if or when the skip type information indicates that a skip type of the block skips encoding the block, the video encoding apparatus 3500 skips encoding the block.

In addition, in step 3620, if or when the skip type information indicates that a skip type of the block encodes skip motion information of the block, the video encoding apparatus 3500 encodes skip motion information of the block to be encoded without encoding coefficient information of the relevant block.

In addition, in step 3620, if or when the skip type information indicates that a skip type of the block encodes coefficient information of the block, the video encoding apparatus 3500 encodes coefficient information of the block to be encoded without encoding skip motion information of the relevant block. In this case, the coefficient information of the block to be encoded may be prediction-encoded by using motion information determined based on motion information of an adjacent block of the relevant block.

Figure 37:
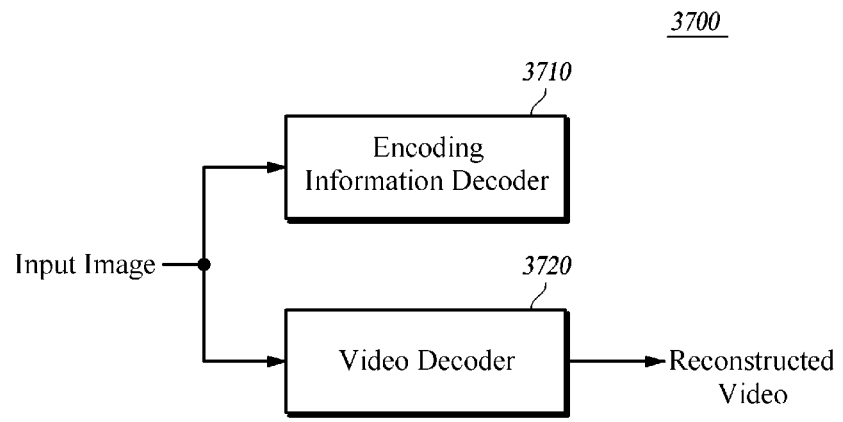
FIG. 37 is a block diagram of a schematic configuration of a video decoding apparatus according to at least one embodiment of the present disclosure.

FIG. 37 is a block diagram illustrating a schematic configuration of a video decoding apparatus 3700 according to another embodiment of the present disclosure.

A video decoding apparatus 3700 according to another embodiment of the present disclosure may include an encoding information decoder 3710 and a video decoder 3720. Other components of the video decoding apparatus 3700, such as the encoding information decoder 3710 and the video decoder 3720 comprise one or more processors and/or application-specific integrated circuits (ASICs) specified for respectively corresponding operation and functions described herein after. The video decoding apparatus 3700 further comprises input units (not shown in FIG. 37) such as one or more buttons, a touch screen, a mic and so on, and output units (not shown in FIG. 37) such as a display, an indicator and so on. The video decoding apparatus 3700 further comprises communication modem(s) to receive and/or communication signals to thereby communicate with a video encoding apparatus (or video encoder) through wire or wireless networks (herein, the wire or wireless networks include, for example, one or more network interfaces including, but not limited to, cellular, Wi-Fi, LAN, WAN, CDMA, WCDMA, GSM, LTE and EPC networks, and cloud computing networks).

The encoding information decoder 3710 reconstructs skip type information indicating a skip type of a block of a video to be encoded by decoding a bitstream, and reconstructs skip motion information of the block by decoding the bitstream according to the skip type information.

According to the skip type information, the video decoder 3720 reconstructs the block based on motion information determined according to a predetermined scheme, skip motion information, or coefficient information reconstructed by decoding the bitstream.

Specifically, if or when skip type information reconstructed by the encoding information decoder 3710 indicates that a skip type of the block encodes a skip motion vector, the video encoder 3720 reconstructs a block that is generated by compensating a motion of the block to be decoded by using skip motion information reconstructed by the encoding information decoder 3710, as the block to be decoded. In addition, if or when skip type information reconstructed by the encoding information decoder 3710 indicates that coefficient information of the block is encoded, the video encoder 3720 reconstructs coefficient information by decoding a bitstream, reconstructs a residual block by inverse-quantizing and inverse-transforming the coefficient information, and reconstructs the block to be decoded by adding the residual block to a predicted block generated by performing motion compensation by using motion information determined according to a predetermined scheme. If or when skip type information reconstructed by the encoding information decoder 3710 indicates that encoding of the block is skipped, the video encoder 3720 reconstructs a block that is generated by motion-compensating the block to be decoded by using motion information determined according to a predetermined scheme, as the block to be decoded.

Herein, the motion information determined according to a predetermined scheme may be motion information determined by using motion information of an adjacent block, but is not limited thereto and may be motion information determined according to various other schemes.

Figure 38:
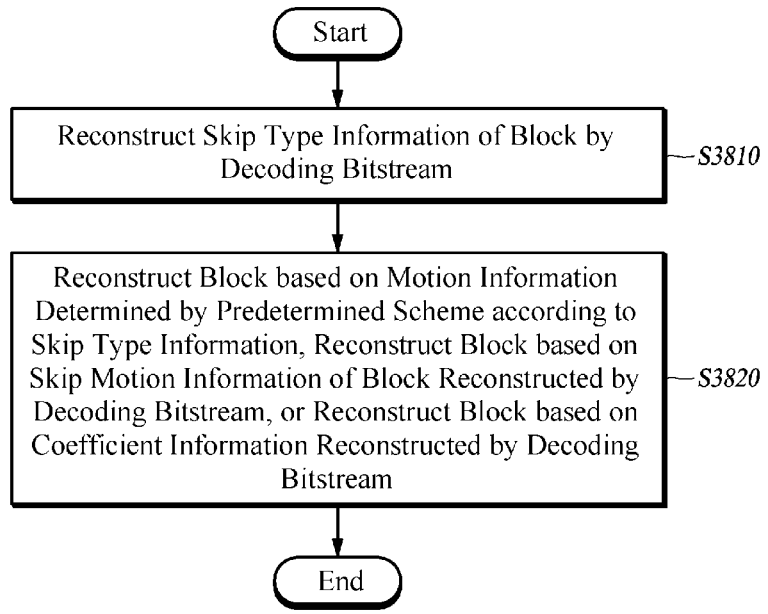
FIG. 38 is a flow diagram of a video decoding method according to at least one embodiment of the present disclosure.

FIG. 38 is a flow diagram illustrating a video decoding method according to an embodiment of the present disclosure.

In a video decoding method according to an embodiment of the present disclosure, the video decoding apparatus 3700 reconstructs skip type information indicating a skip type of a block to be decoded by decoding a bitstream (S3810), and reconstructs the block based on motion information determined according to a predetermined scheme, skip motion information of the block reconstructed by decoding the bitstream, or coefficient information reconstructed by decoding the bitstream, according to the skip type information (S3820).

In step S3810, the video decoding apparatus 3700 may reconstruct the skip type information only when a block mode of the block is a skip mode. Specifically, data generated by encoding the skip type information is included in the bitstream only when a block mode of the block to be decoded is a skip mode. Therefore, only when a block mode of the block is a skip mode, data generated by encoding the skip type information is extracted and decoded to reconstruct the skip type information.

In step 3820, if or when the reconstructed skip type information indicates that encoding of the block is skipped, the video decoding apparatus 3700 may reconstruct the block based on motion information determined according to a predetermined scheme. Specifically, if or when the skip type information indicates that encoding of the block is skipped, the video encoding apparatus 3500 skips encoding the block and the bitstream does not include encoding information of the block or data generated by encoding coefficient information. Therefore, the video decoding apparatus 3700 does not extract the data from the bitstream, determines motion information of the block (that is, a motion vector and a reference picture index) according to a predetermine scheme arranged with the video encoding apparatus 3500, and reconstructs a block that is generated by compensating a motion of the block by using the determined motion information, as the block to be decoded.

In step 3820, if or when the skip type information indicates that skip motion information of the block is encoded, the video decoding apparatus 3700 may reconstruct the block based on skip motion information of the block reconstructed by decoding the bitstream. Specifically, if or when the skip type information indicates that skip motion information of the block is encoded, the video encoding apparatus 3500 encodes not coefficient information of the block but skip motion information of the block and the bitstream does not include data generated by encoding the coefficient information. Therefore, the video decoding apparatus 3700 reconstructs skip motion information by extracting and decoding data generated by encoding the skip motion information from the bitstream, and reconstructs a block that is generated by compensating a motion of the block by using the reconstructed skip motion information, as the block to be decoded.

In step 3820, if or when the skip type information indicates that coefficient information of the block is encoded, the video decoding apparatus 3700 may reconstruct the block based on coefficient information reconstructed by decoding the bitstream. Specifically, if or when the skip type information indicates that coefficient information of the block is encoded, the video encoding apparatus 3500 encodes not skip motion information of the block but coefficient information of the block and the bitstream does not include data generated by encoding the coefficient information. Therefore, the video decoding apparatus 3700 reconstructs the coefficient information by extracting and decoding data generated by encoding the coefficient information from the bitstream, reconstructs a residual block by inverse-quantizing and inverse-transforming the reconstructed coefficient information, determines motion information of the block (that is, a motion vector and a reference picture index) according to a predetermine scheme arranged with the video encoding apparatus 3500, and reconstructs the block to be decoded by adding the reconstructed residual block to a predicted block that is generated by compensating a motion of the block by using the determined motion information.

Second Embodiment

A second embodiment of the present disclosure will be described below. In particular, another embodiment of encoding a tree structure of transform information related to a transform subblock (for example, a transform type, a transform subblock partition flag, and a CBP flag) will be described in the second embodiment of the present disclosure.

According to the second embodiment, a transform subblock may be generated by dividing each macroblock or subblock into variable-size blocks. In addition, a transform type may be determined according to a transform subblock. Alternatively, a transform type may be determined according to a prediction mode.

In this case, information on the size and type of an available transform subblock may be included in various headers. Examples of the headers may include a slice header, a picture header, and a sequence header. In addition, the maximum transform subblock size and the minimum transform subblock size may be encoded, and the minimum transform subblock size may be different between intra prediction and inter prediction. For example, if or when the maximum transform subblock size is 64×64 and the minimum transform subblock size is 4×4, the minimum transform subblock size of an intra prediction block may be encoded into 16×16. In this case, a transform subblock size available for transform of an intra prediction block may be 64×64, 32×32, and 16×16, and a transform subblock size available for transform of an inter prediction block may be 64×64, 32×32, 16×16, 8×8, and 4×4.

Figure 39:
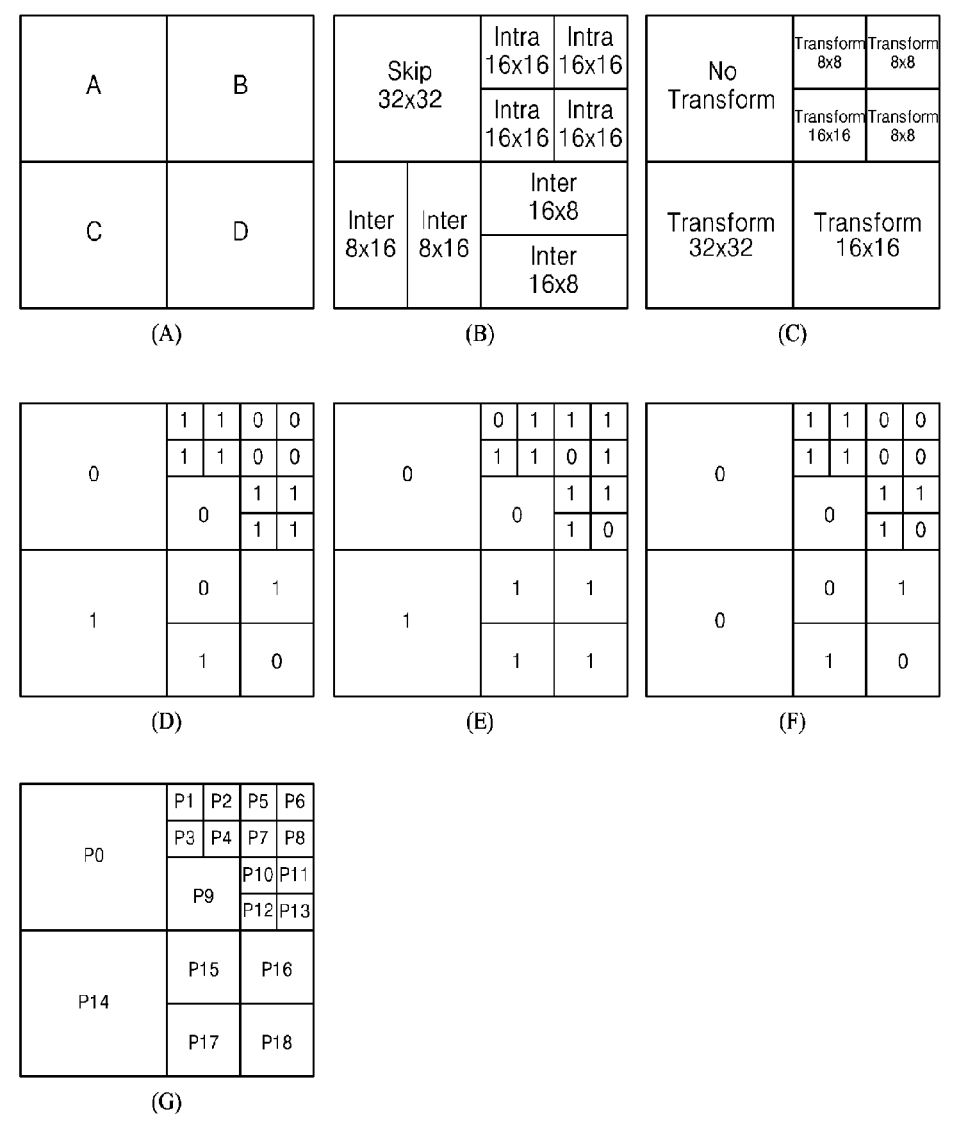

FIG. 39 is a diagram illustrating an example of transform information encoding according to a second embodiment of the present disclosure.

FIG. 39A illustrates the case where a current macroblock is divided into subblocks. Specifically, a current macroblock is divided into four subblocks A, B, C and D.

FIG. 39B illustrates predicted subblocks of subblocks in a current macroblock. Specifically, a subblock A is a skip mode, a subblock B is divided into four 16×16 pixel intra prediction subblocks, a subblock C is divided into two 8×16 inter prediction subblocks, and a subblock D is divided into two 16×8 inter prediction subblocks.

FIG. 39C illustrates the size of a transform subblock of a subblock in a current macroblock. Specifically, a subblock A is not transformed because it is a skip mode. A subblock B is transformed and quantized into an 8×8 pixel transform subblock, a subblock C is transformed and quantized into a 32×32 pixel transform subblock, and a subblock D is transformed and quantized into a 16×16 pixel transform subblock.

FIGS. 39D, 39E and 39F illustrate CBP flags of one luminance component and two chrominance components.

FIG. 39G illustrates a block number of a subblock in a current macroblock.

Figure 40:
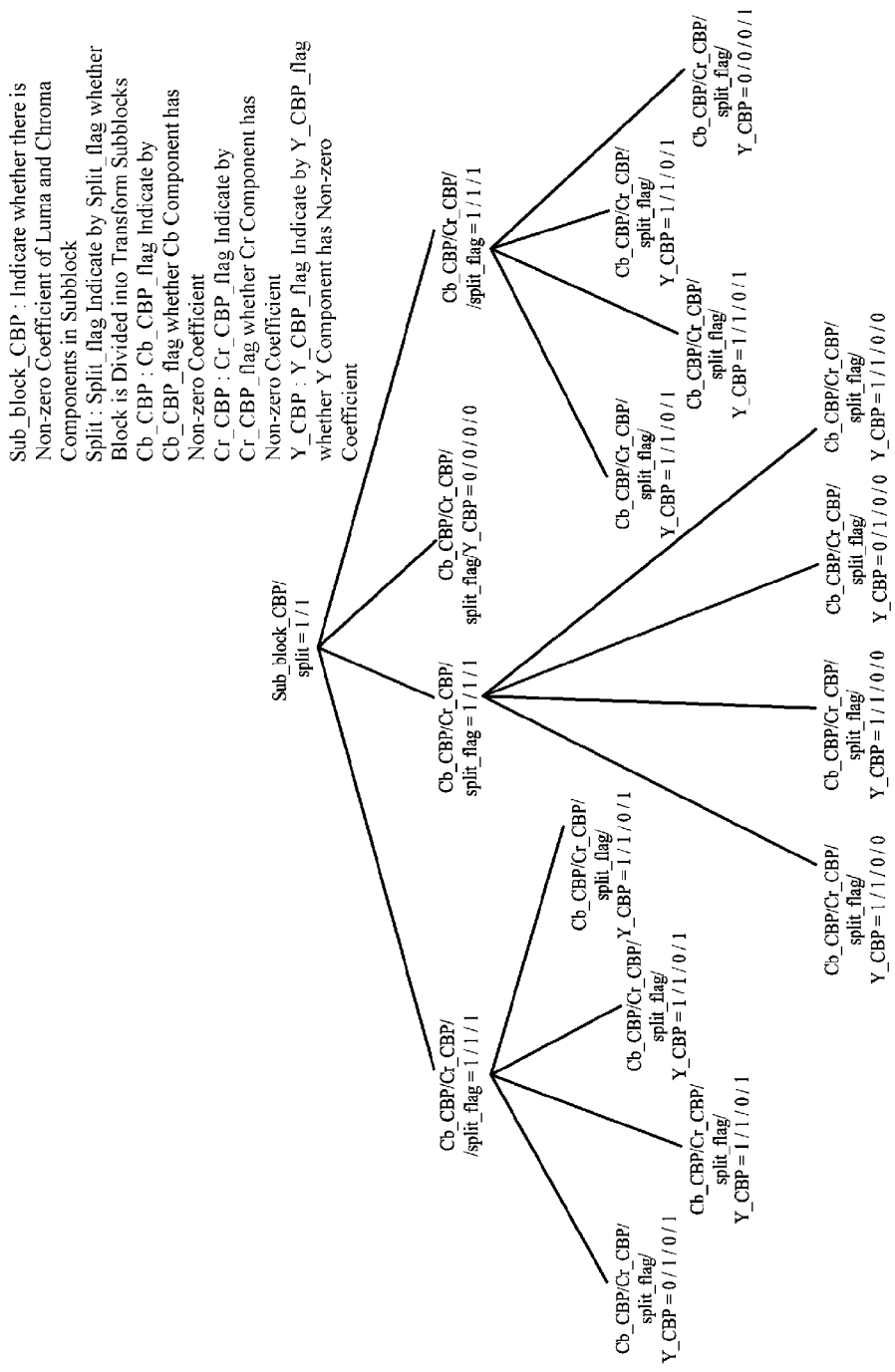
FIG. 40 is a diagram of an example of encoding transform information of a subblock B in FIG. 39 by using a tree structure.

FIG. 40 is a diagram illustrating an example of encoding transform information of the subblock B in FIG. 39 by using a tree structure.

Referring to FIGS. 39 and 40, a Sub_block_CBP_flag indicating whether a non-zero transform coefficient of a luminance component and a chrominance component is present in a current subblock B is encoded, and then a split_flag indicating whether a current subblock is divided into transform subblocks is encoded. Thereafter, a CBP_flag and a split_flag of chrominance components (Cr, Cb) and a luminance component (Y) are encoded with respect to each transform subblock. Referring to FIG. 39G, a split_flag and a cbp_flag of transform subblocks divided into P1, P2, P3 and P4 are encoded into 1/1/1 in the order of Cb_CBP_flag, Cr_CBP_flag, and splitflag, and the divided transform subblocks P1, P2, P3 and P4 of the respective transform subblocks are encoded in the order of Cb_CBP_flag, Cr_CBP_flag, splitflag, and Y_CBP_flag. Other transform subblocks are encoded in the same order and syntax.

Herein, each syntax may be encoded by context-adaptive binary arithmetic coding (CABAC) by using a different context according to a peripheral condition, or the syntax value may be encoded into 1 bit without using syntax.

FIG. 41 is a diagram illustrating an example of encoding transform information of the subblock C in FIG. 39 by using a tree structure.

Referring to FIGS. 39 and 41, a current subblock C is an inter prediction block that is not divided into transform subblocks. Thus, a Sub_block_CBP_flag of the current subblock C is encoded into 1, a split_flag is encoded into 0, and Cb_CBP_flag, Cr_CBP_flag, and Y_CBP_flag are sequentially encoded.

FIG. 42 is a diagram illustrating another example of encoding transform information of the subblock C in FIG. 39 by using a tree structure.

Referring to FIGS. 39 and 42, a split_flag indicating whether a current subblock is divided into transform subblocks is encoded, and then a CBP flag (Cb, Cr, Y) is encoded. In this case, a sub_block_CBP_flag may not be encoded. In addition, the sequence of a sub_block_CBP_flag and a split_flag of the uppermost node may be changed in the respective tree structures of all subblocks.

Figure 43:
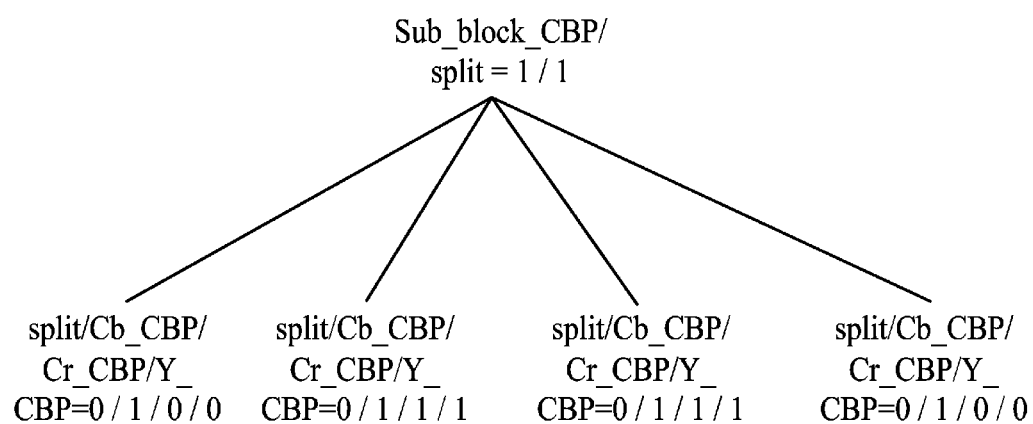
FIG. 43 is a diagram of an example of encoding transform information of a subblock D in FIG. 39 by using a tree structure.

FIG. 43 is a diagram illustrating an example of encoding transform information of the subblock D in FIG. 39 by using a tree structure.

Referring to FIGS. 39 and 43, a current subblock D is an inter prediction block that is divided into transform subblocks. Thus, a sub_block_CBP_flag and a split_flag of the current subblock D are encoded into 1. Thereafter, referring to FIG. 39G, a split_flag and a cbp_flag of the respective transform subblocks divided in the order of P15, P16, P17, and P18 are encoded in the order of splitflag, Cb_CBP_flag, Cr_CBP_flag, and Y_CBP_flag.

The above syntax and the order of the syntax are merely exemplary, and are not limited to the above examples. The encoding data of transform information according to an embodiment of the present disclosure may include one or more syntax and transform information among the transform information sub_block_CBP_flag, split flag, and cbp_flag (for the respective components). In particular, it includes the case where a sub_block_CBP_flag indicating whether a non-zero transform coefficient is present in the chrominance and luminance components of each subblock is encoded as the uppermost node value.

Since transform information decoding according to an embodiment of the present disclosure corresponds to an inverse process of transform information encoding, those skilled in the art may understand a transform information decoding process from the above transform information encoding process.

As described above, according to the embodiments of the present disclosure, a skip mode of a block is defined in various modes. Since a video can be encoded and/or decoded by selectively using various modes according to video characteristics and/or implementation modes, video compression efficiency can be improved.

In the description above, although all of the components of the embodiments of the present disclosure have been explained as assembled or operatively connected as a unit, the present disclosure is not intended to limit itself to such embodiments. Rather, within the objective scope of the claimed invention, the respective components is able to be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program is easily deduced by a person skilled in the art. The computer program may be stored in non-transitory computer readable recording medium, which in operation can realize some embodiments of the present disclosure. Examples of the non-transitory computer readable recording medium include magnetic recording media, such as a hard disk, a floppy disk, and a magnetic tape, and optical recording media, such as a compact disk read only memory (CD-ROM) and a digital video disk (DVD), magneto-optical media, such as a floptical disk, and hardware devices that are specially configured to store and execute program instructions, such as a ROM, a random access memory (RAM), and a flash memory.

According to the various embodiments of the present disclosure, it is possible to improve video compression efficiency by efficiently encoding encoding information used to encode a video and encoding a video by selectively using various encoding schemes and decoding schemes. In addition, it is possible to improve video reconstruction efficiency by adaptively decoding a video in accordance with the video encoding.

Although exemplary aspects of the present disclosure have been described for illustrative purposes, those of ordinary skill in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary aspects of the present disclosure have not been described for limiting purposes. Accordingly, the scope of the claimed invention is not to be limited by the above aspects but by the claims and the equivalents thereof.

What is claimed is:

1. A method performed by a video decoding apparatus, the method comprising:

identifying a current block to be decoded by dividing a maximum size block;

decoding, from a bitstream, block mode information indicating whether a block mode of the current block to be decoded is a skip mode, wherein the skip mode is a mode where information on residual signals of the current block is not encoded into the bitstream and a skip motion information of the current block is encoded into the bitstream, the skip motion information being information for indicating a motion vector of the current block; and reconstructing the current block based on the decoded block mode information, wherein, when the block mode information indicates that the block mode of the current block is not the skip mode, the reconstructing of the current block comprises:

decoding, from the bitstream, block type flag indicating whether the current block is intra-predicted or inter-predicted, when the block type flag indicates that the current block is intra-predicted, decoding intra prediction information of the current block from the bitstream, reconstructing information on residual signals of one or more subblocks divided from the current block, by decoding partition information of a tree structure from the bitstream, and reconstructing the current block based on the information on the residual signals of each of the subblocks and the intra prediction information, wherein the decoding of the partition information from the bitstream comprises:

reconstructing a split flag indicating whether a block corresponding thereto is divided into a plurality of lower layer blocks in the tree structure;

reconstructing a first chroma coded block information and a second chroma coded block information corresponding to chrominance components of the corresponding block, irrespectively of whether the split flag indicates that the corresponding block is divided into the lower layer blocks, wherein the first chroma coded block information indicates whether a first chrominance component of the corresponding block has at least one non-zero transform coefficient, and the second chroma coded block information indicates whether a second chrominance component of the corresponding block has at least one non-zero transform coefficient; and when the split flag indicates that the corresponding block is not divided into the lower layer blocks, reconstructing a luma coded block information indicating whether a luminance component of the corresponding block has at least one non-zero transform coefficient, and identifying the corresponding block as one of the subblocks, wherein the luma coded block information of the corresponding block is not reconstructed from the bitstream when the split flag indicates that the corresponding block is divided into the lower layer blocks.

2. The method of claim 1, wherein the maximum size block is divided based on partition mode information decoded from the bitstream.

3. The method of claim 1, further comprising:

decoding information on a minimum subblock size and information on a maximum subblock size from the bitstream, wherein the subblocks divided from the current block have sizes ranging from the minimum subblock size to the maximum subblock size.

4. The method of claim 3, wherein the information on the minimum subblock size and information on the maximum subblock size are decoded from the bitstream in the unit of sequences.

5. The method of claim 1, wherein the first chroma coded block information of the corresponding block is decoded when the first chrominance component of an upper layer block from which the corresponding block is divided has at least one non-zero transform coefficient, and the second chroma coded block information of the corresponding block is decoded when the second chrominance component of the upper layer block has at least one non-zero transform coefficient.

6. The method of claim 1, wherein, when the block mode information indicates that the block mode of the current block is the skip mode, the reconstructing of the current block comprises:

decoding, from the bitstream, the skip motion information of the current block and determining the motion vector of the current block based on the skip motion information, predicting the current block using the determined motion vector of the current block, and reconstructing the current block directly from the predicted block, without decoding the information on residual signals of the current block from the bitstream.

* * * * *